United States Patent
Sakuma

(10) Patent No.: US 10,197,780 B2
(45) Date of Patent: Feb. 5, 2019

(54) ZOOM LENS AND IMAGE PICKUP APPARATUS INCLUDING THE SAME

(71) Applicant: CANON KABUSHIKI KAISHA, Tokyo (JP)

(72) Inventor: Koichi Sakuma, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/786,712

(22) Filed: Oct. 18, 2017

(65) Prior Publication Data

US 2018/0113288 A1    Apr. 26, 2018

(30) Foreign Application Priority Data

Oct. 24, 2016   (JP) .................................. 2016-207608

(51) Int. Cl.
| | |
|---|---|
| G02B 15/14 | (2006.01) |
| G02B 15/28 | (2006.01) |
| G02B 13/18 | (2006.01) |
| G03B 3/00 | (2006.01) |

(52) U.S. Cl.
CPC ............. G02B 15/28 (2013.01); G02B 13/18 (2013.01); G03B 3/00 (2013.01)

(58) Field of Classification Search
CPC ......... G02B 15/28; G02B 13/18; G02B 15/14
USPC .................................................. 359/676, 690
See application file for complete search history.

(56) References Cited

U.S. PATENT DOCUMENTS

| | | | | |
|---|---|---|---|---|
| 5,309,284 A | * | 5/1994 | Nakatsuji ............. | G02B 15/173 359/687 |
| 5,760,957 A | * | 6/1998 | Suzuki ................. | G02B 15/173 359/554 |
| 2007/0002443 A1 | * | 1/2007 | Toyama ............... | G02B 15/173 359/557 |
| 2009/0086321 A1 | * | 4/2009 | Mizuguchi .......... | G02B 15/173 359/557 |
| 2011/0037878 A1 | * | 2/2011 | Wakazono .......... | G02B 15/161 348/240.3 |
| 2011/0228407 A1 | * | 9/2011 | Yamaguchi ......... | G02B 15/173 359/687 |

(Continued)

FOREIGN PATENT DOCUMENTS

| | | |
|---|---|---|
| JP | 2006-337745 A | 12/2006 |
| JP | 2012-088603 A | 5/2012 |
| JP | 2013-7898 A | 1/2013 |

*Primary Examiner* — James Greece
(74) *Attorney, Agent, or Firm* — Carter, Deluca, Farrell & Schmidt LLP

(57) ABSTRACT

A zoom lens includes a positive first unit, a negative second unit, and a rear lens system. The rear lens system includes a positive unit A, a negative unit B, and a positive C. The first unit is not moved for zooming, the unit A is moved for zooming, and intervals between adjacent lens units are changed during zooming. The first unit includes positive and negative lenses, the unit C includes positive and negative lenses, the second unit includes negative lenses, and the unit B includes positive lenses. An Abbe number average value of the positive lenses in the first unit, an Abbe number average value of the negative lenses in the second unit, an Abbe number average value of the positive lenses in the unit B, and an Abbe number average value of the positive lenses in the unit C are appropriately set.

12 Claims, 11 Drawing Sheets

(56) References Cited

U.S. PATENT DOCUMENTS

| | | | | |
|---|---|---|---|---|
| 2012/0314298 A1* | 12/2012 | Ota | .................... | G02B 15/173 359/683 |
| 2015/0097995 A1* | 4/2015 | Wada | ................ | H04N 5/23296 348/294 |
| 2016/0062094 A1* | 3/2016 | Kawamura | ............ | G02B 15/17 359/684 |
| 2016/0062135 A1* | 3/2016 | Kawamura | .......... | G02B 15/173 359/557 |

* cited by examiner

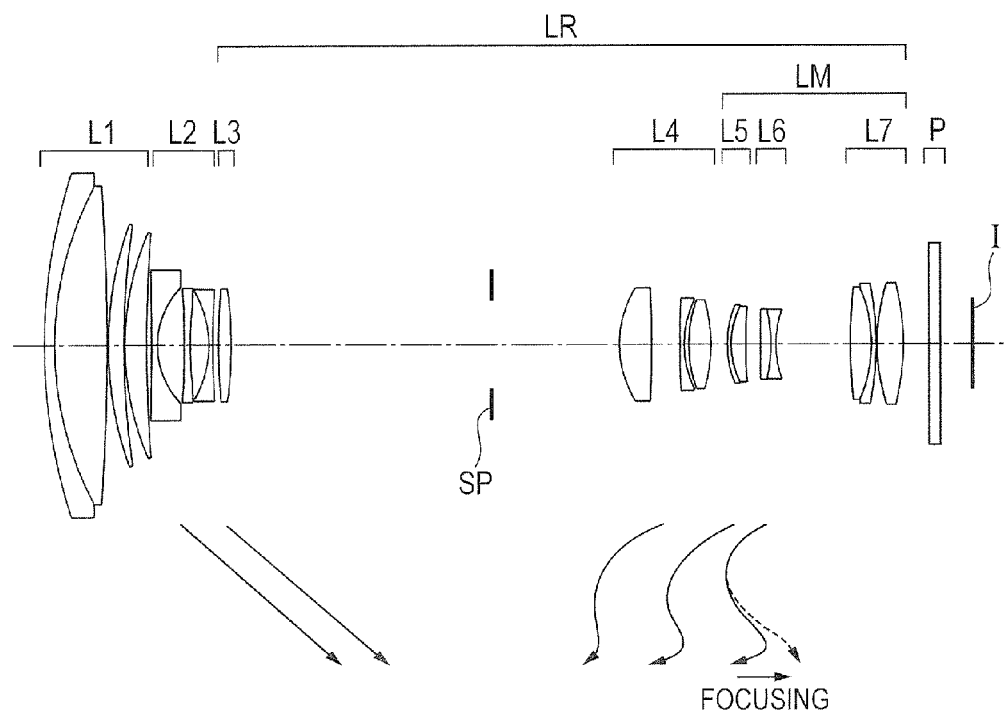
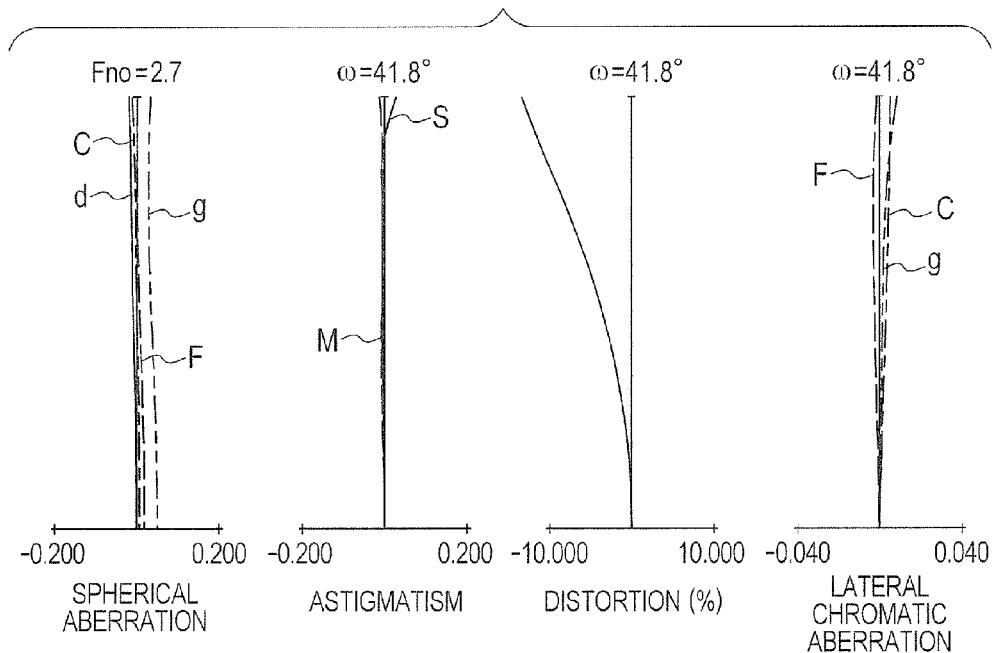

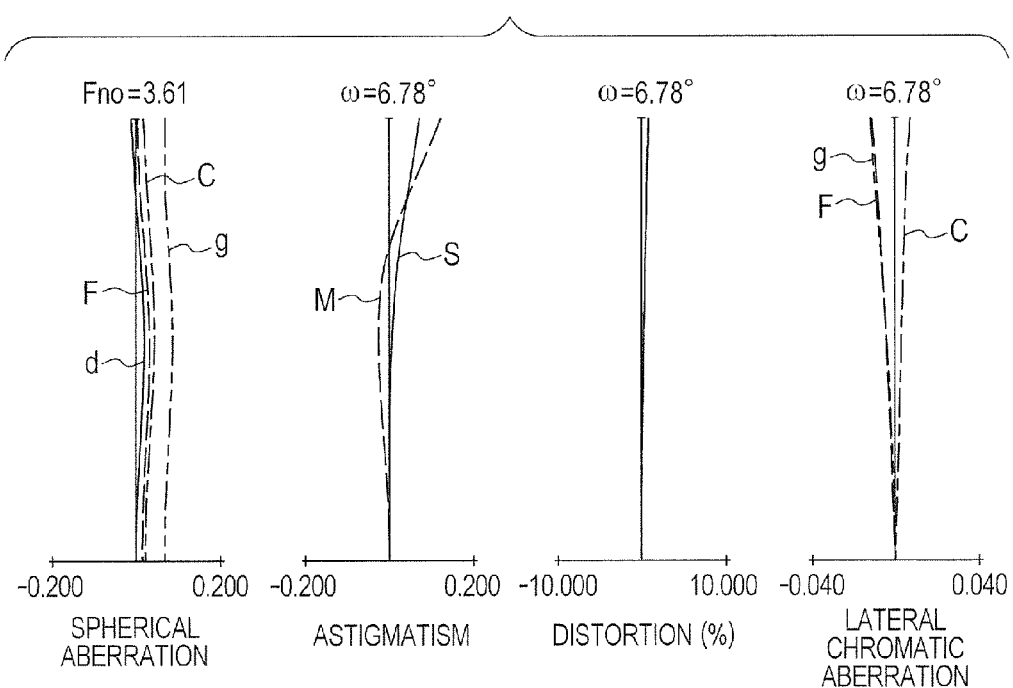
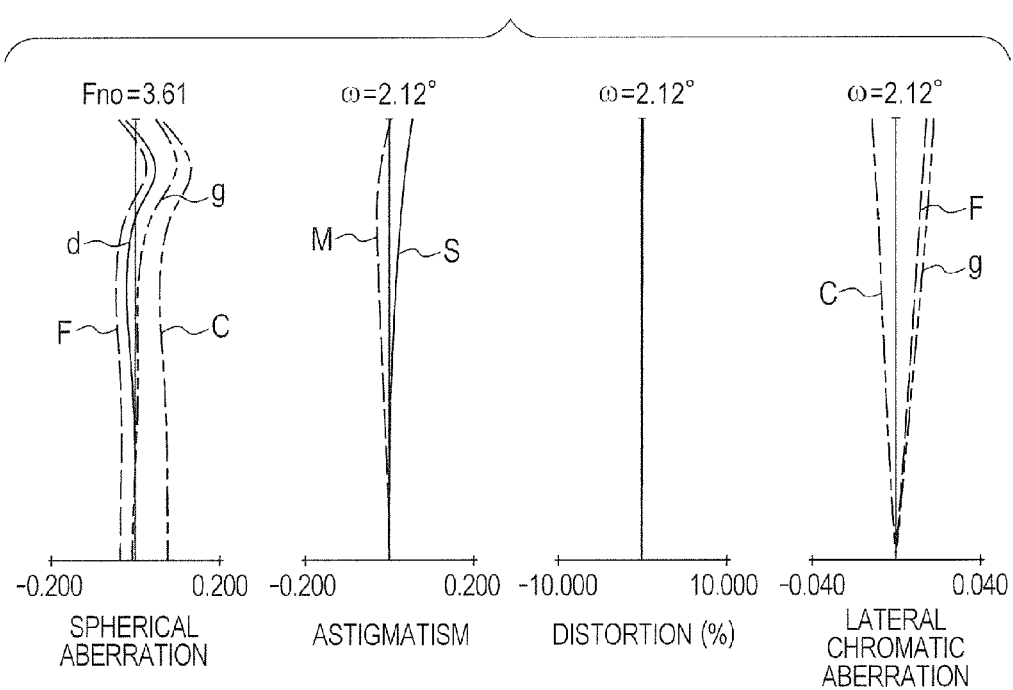

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, which are suitable for an imaging optical system to be used in an image pickup apparatus, such as a digital camera, a video camera, a broadcasting camera, a monitoring camera, or a silver-halide film camera.

Description of the Related Art

In recent years, the image pickup apparatus has achieved high-quality image resolution along with an increase in pixel count of image pickup elements. Owing to this, an imaging optical system that is used in the image pickup apparatus is demanded to be a zoom lens having a high zoom ratio (magnification varying ratio), high optical performance over the entire zoom range, and a short total lens length. As a zoom lens satisfying those demands, there has been known a positive lead type zoom lens in which a lens unit having a positive refractive power is arranged closest to an object side (Japanese Patent Application Laid-Open No. 2012-88603, Japanese Patent Application Laid-Open No. 2013-7898, and Japanese Patent Application Laid-Open No. 2006-337745).

In Japanese Patent Application Laid-Open No. 2012-88603, there is disclosed a zoom lens having a zoom ratio of about 10 and including, in order from an object side, a first lens unit to a fourth lens unit having positive, negative, positive, and positive refractive powers, in which the first lens unit is configured not to move during zooming. In Japanese Patent Application Laid-Open No. 2013-7898, there is disclosed a zoom lens having a zoom ratio of about 10 and including, in order from an object side, a first lens unit to a fifth lens unit having positive, negative, positive, negative, and positive refractive powers, in which the first lens unit and the fifth lens unit are configured not to move during zooming.

In Japanese Patent Application Laid-Open No. 2006-337745, there is disclosed a zoom lens having a zoom ratio of about 20 and including, in order from an object side, a first lens unit to a fifth lens unit having positive, negative, positive, negative, and positive refractive powers, in which the first lens unit and the fifth lens unit are configured not to move during zooming.

In recent years, as a zoom lens that is used in an image pickup apparatus, there is a strong demand for a zoom lens that has a high zoom ratio, is compact as an entire system, and is configured to satisfactorily correct various aberrations, thereby achieving high optical performance. In general, in order to achieve a zoom lens that has a predetermined zoom ratio and is compact as an entire system, the number of lenses may be reduced while the refractive power of each lens unit constructing the zoom lens is increased. In the zoom lens configured in this way, however, the amount of generated various aberrations is increased along with an increase in refractive power of each lens surface.

In order to achieve a positive-lead type zoom lens that is compact as an entire system, has a high zoom ratio and high optical performance over the entire zoom range, and is configured to satisfactorily correct various aberrations including chromatic aberration, it is important to appropriately set each element constructing the zoom lens. In Japanese Patent Application Laid-Open No. 2012-88603, the first lens unit includes one positive lens, and hence variation in axial chromatic aberration tends to be increased during zooming. In Japanese Patent Application Laid-Open No. 2013-7898, the final lens unit includes one positive lens, and hence variation in lateral chromatic aberration accompanying zooming tends to be increased.

SUMMARY OF THE INVENTION

The present invention has an object to provide a zoom lens that has a high zoom ratio and is configured to satisfactorily correct chromatic aberration over the entire zoom range, thereby easily achieving high optical performance, and an image pickup apparatus including the zoom lens.

According to one embodiment of the present invention, there is provided a zoom lens including, in order from an object side to an image side: a first lens unit having a positive refractive power; a second lens unit having a negative refractive power; and a rear lens system including a plurality of lens units, the rear lens system including a lens unit A having a positive refractive power, a lens unit B having a negative refractive power, and a lens unit C having a positive refractive power, the lens unit A, the lens unit B and the lens unit C being arranged in said order from the object side to the image side, in which the first lens unit is not moved for zooming, the lens unit A is moved for zooming, and intervals between adjacent lens units are changed during zooming, in which the first lens unit includes a positive lens and a negative lens, the lens unit C includes a positive lens and a negative lens, the second lens unit includes a negative lens, and the lens unit B includes a positive lens, and in which the following conditional expressions are satisfied:

$60.0 < \nu1pave < 95.0;$ $50.0 < \nu2nave < 90.0;$ $1.6 < \nu1pave/\nu Bpave < 5.0;$ and $0.6 < \nu1pave/\nu Cpave < 1.4,$ where ν1pave represents an average value of Abbe numbers of materials of positive lenses included in the first lens unit, ν2nave represents an average value of Abbe numbers of materials of the negative lenses included in the second lens unit, νBpave represents an average value of Abbe numbers of materials of the positive lenses included in the lens unit B, and νCpave represents an average value of Abbe numbers of materials of the positive lenses included in the lens unit C.

Further features of the present invention will become apparent from the following description of exemplary embodiments with reference to the attached drawings.

BRIEF DESCRIPTION OF THE DRAWINGS

FIG. 7 is a lens cross-sectional view of a zoom lens according to Embodiment 4 of the present invention.

FIG. 8A is aberration diagrams of the zoom lens of Embodiment 4 at the wide angle end.

FIG. 10B is aberration diagrams of the zoom lens of Embodiment 5 at the intermediate zoom position.

FIG. 10C is aberration diagrams of the zoom lens of Embodiment 5 at the telephoto end.

DESCRIPTION OF THE EMBODIMENTS

Now, exemplary embodiments of the present invention are described with reference to the attached drawings. A zoom lens according to the present invention includes, in order from an object side to an image side: a first lens unit having a positive refractive power; a second lens unit having a negative refractive power; and a rear lens system including a plurality of lens units. The rear lens system includes a sub lens system including, in order from the object side to the image side, a lens unit A having a positive refractive power, a lens unit B having a negative refractive power, and a lens unit C having a positive refractive power. The first lens unit is configured not to move, the lens unit A is configured to move, and an interval between adjacent lens units is changed, during zooming.

Figure 1:
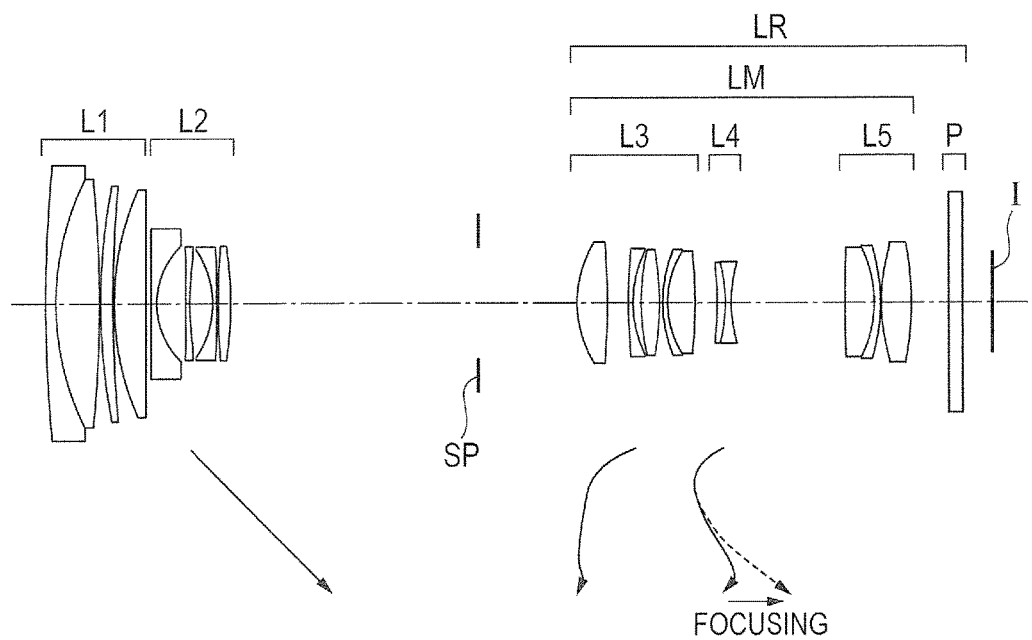
FIG. 1 is a lens cross-sectional view of a zoom lens according to Embodiment 1 of the present invention.
Figure 2A:
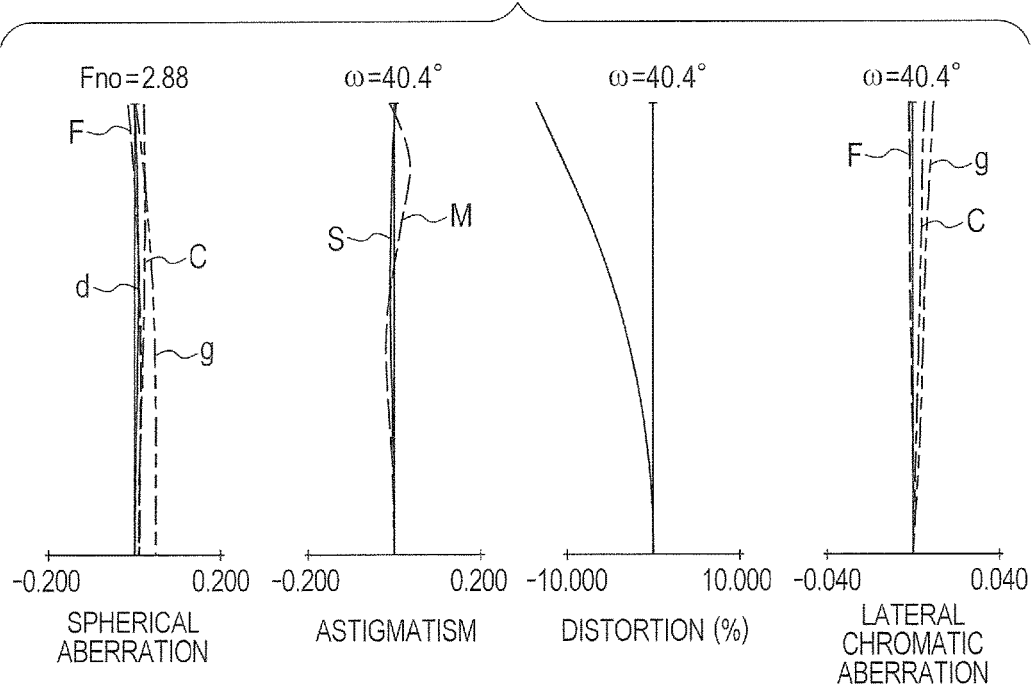
FIG. 2A is aberration diagrams of the zoom lens of Embodiment 1 at a wide angle end.
Figure 2B:
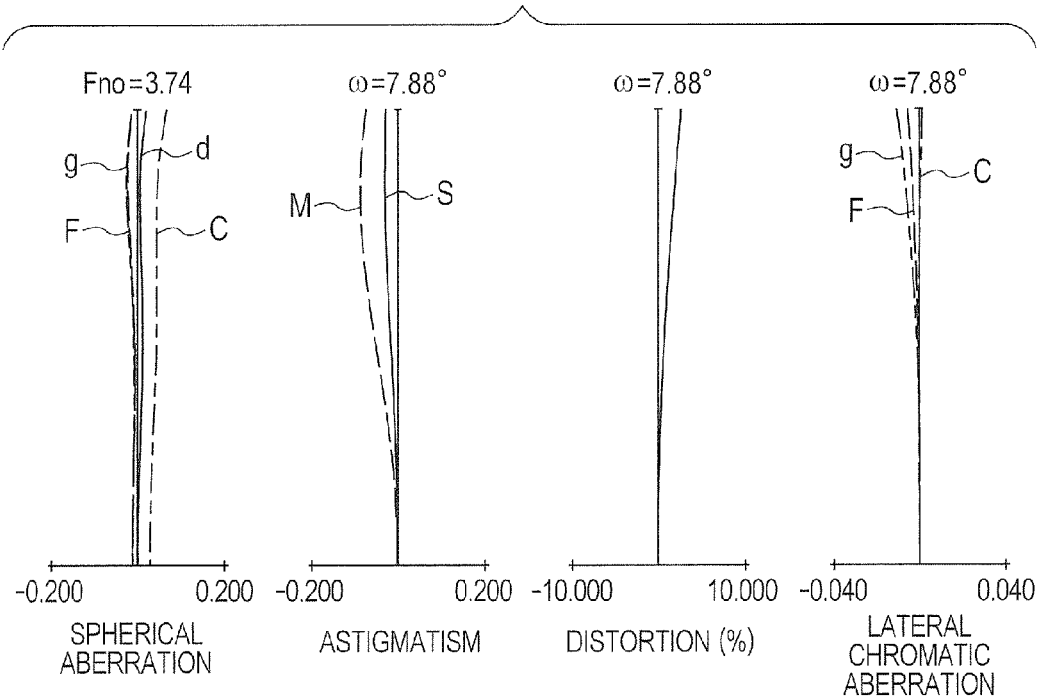
FIG. 2B is aberration diagrams of the zoom lens of Embodiment 1 at an intermediate zoom position.
Figure 2C:
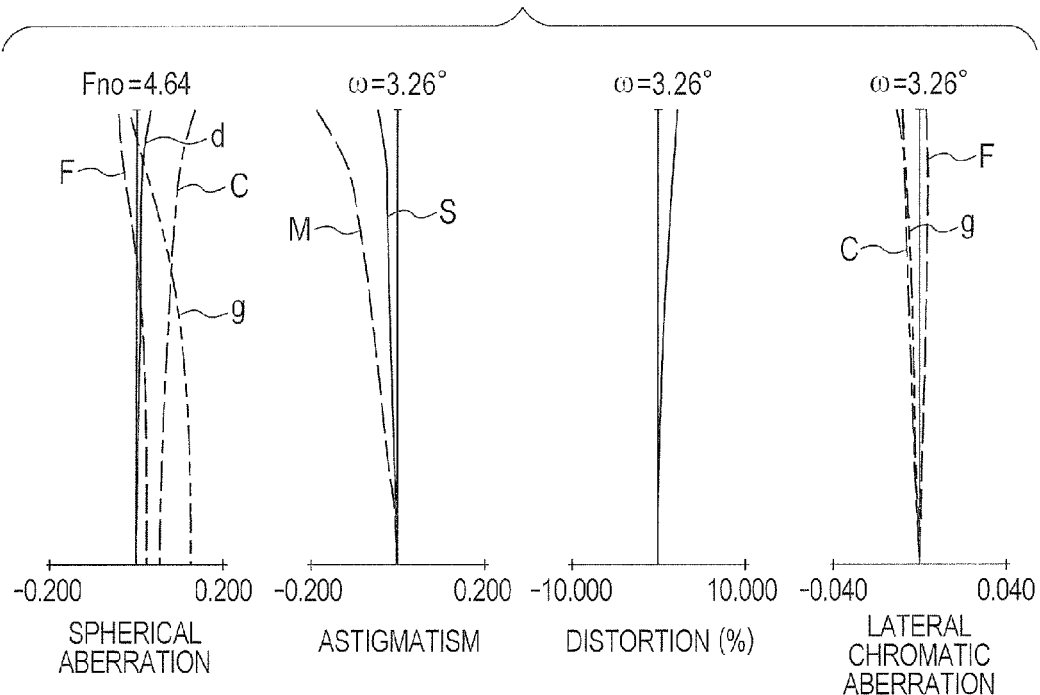
FIG. 2C is aberration diagrams of the zoom lens of Embodiment 1 at a telephoto end.
Figure 3:
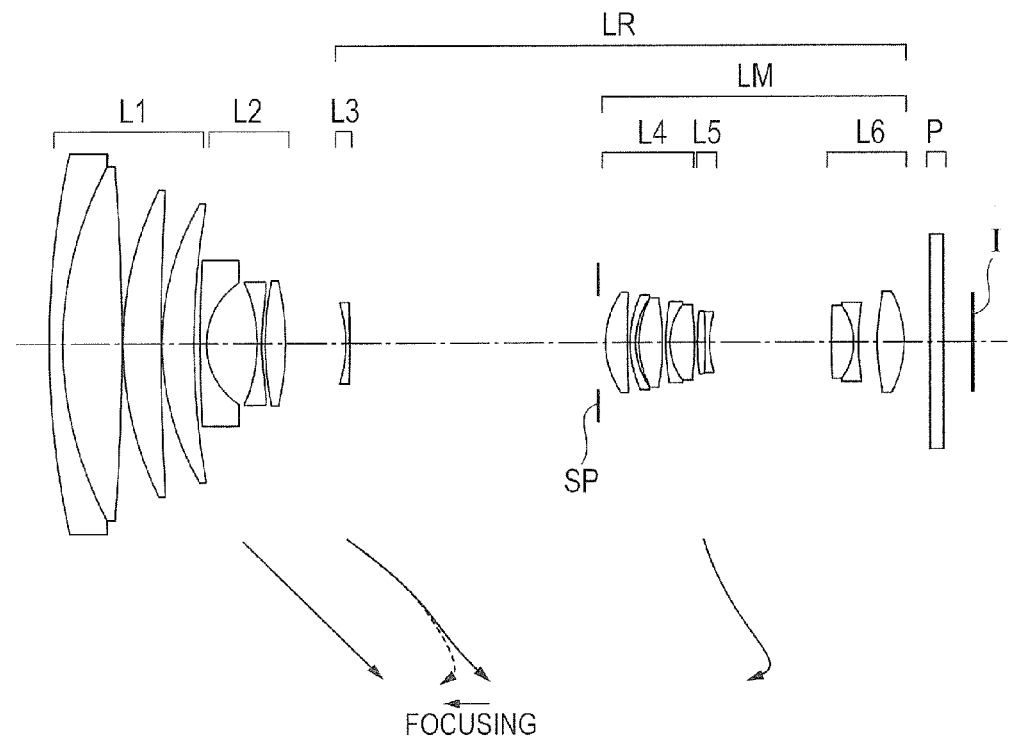
FIG. 3 is a lens cross-sectional view of a zoom lens according to Embodiment 2 of the present invention.
Figure 4A:
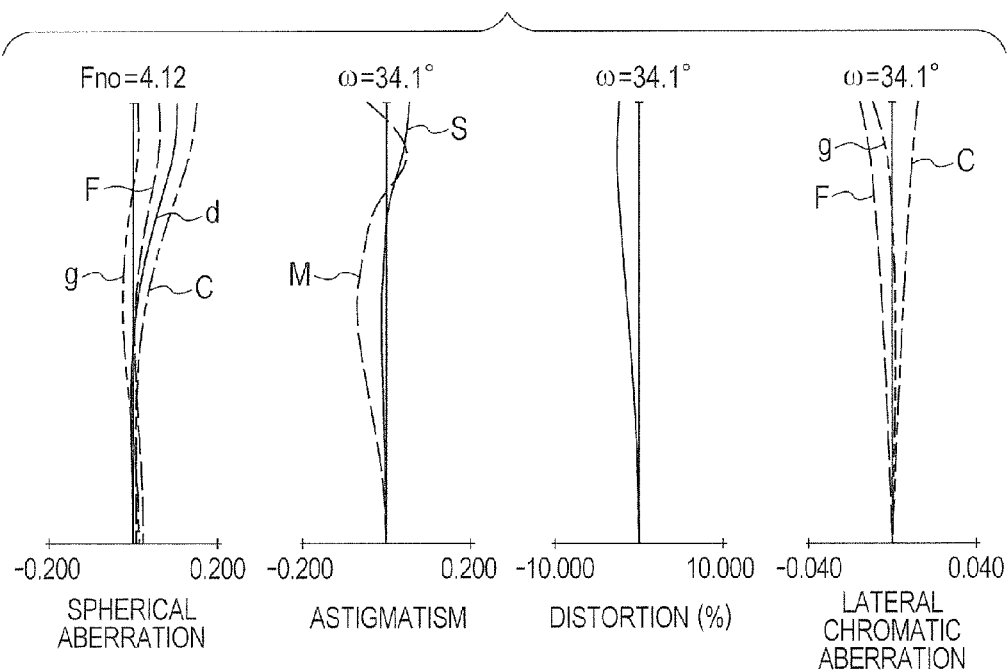
FIG. 4A is aberration diagrams of the zoom lens of Embodiment 2 at the wide angle end.
Figure 4B:
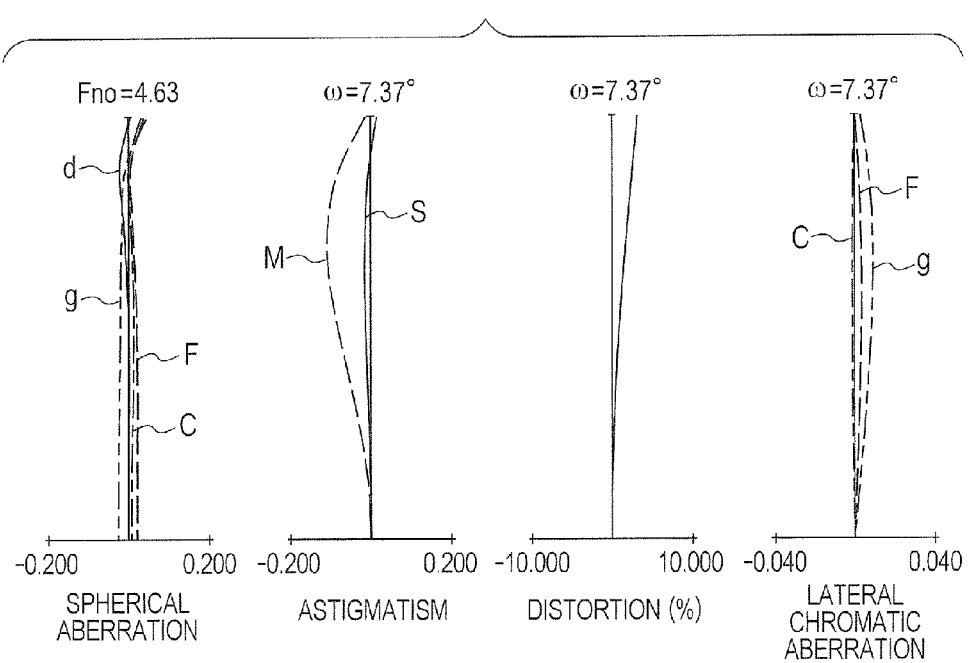
FIG. 4B is aberration diagrams of the zoom lens of Embodiment 2 at the intermediate zoom position.
Figure 4C:
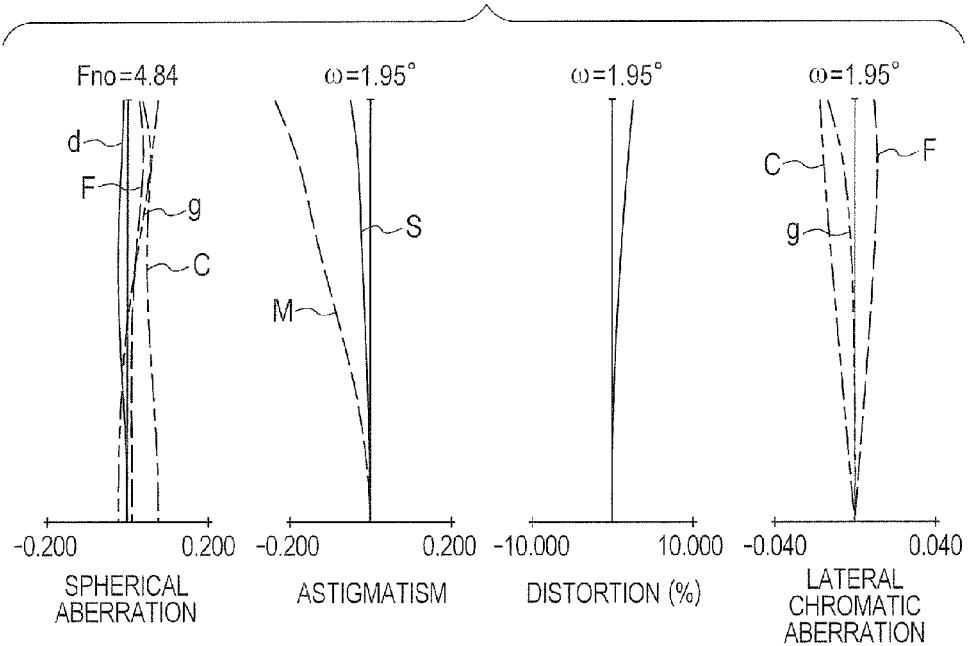
FIG. 4C is aberration diagrams of the zoom lens of Embodiment 2 at the telephoto end.

FIG. 1 is a lens cross-sectional view of a zoom lens according to Embodiment 1 of the present invention. FIG. 2A, FIG. 2B, and FIG. 2C are longitudinal aberration diagrams at a wide angle end (short focal length end), an intermediate zoom position, and a telephoto end (long focal length end), respectively, of the zoom lens according to Embodiment 1. The zoom lens according to Embodiment 1 has a zoom ratio of 14.55 and an F number of from 2.88 to 4.64. FIG. 3 is a lens cross-sectional view of a zoom lens according to Embodiment 2 of the present invention. FIG. 4A, FIG. 4B, and FIG. 4C are longitudinal aberration diagrams at the wide angle end, the intermediate zoom position, and the telephoto end, respectively, of the zoom lens according to Embodiment 2. The zoom lens according to Embodiment 2 has a zoom ratio of 19.49 and an F number of from 4.12 to 4.84.

Figure 5:
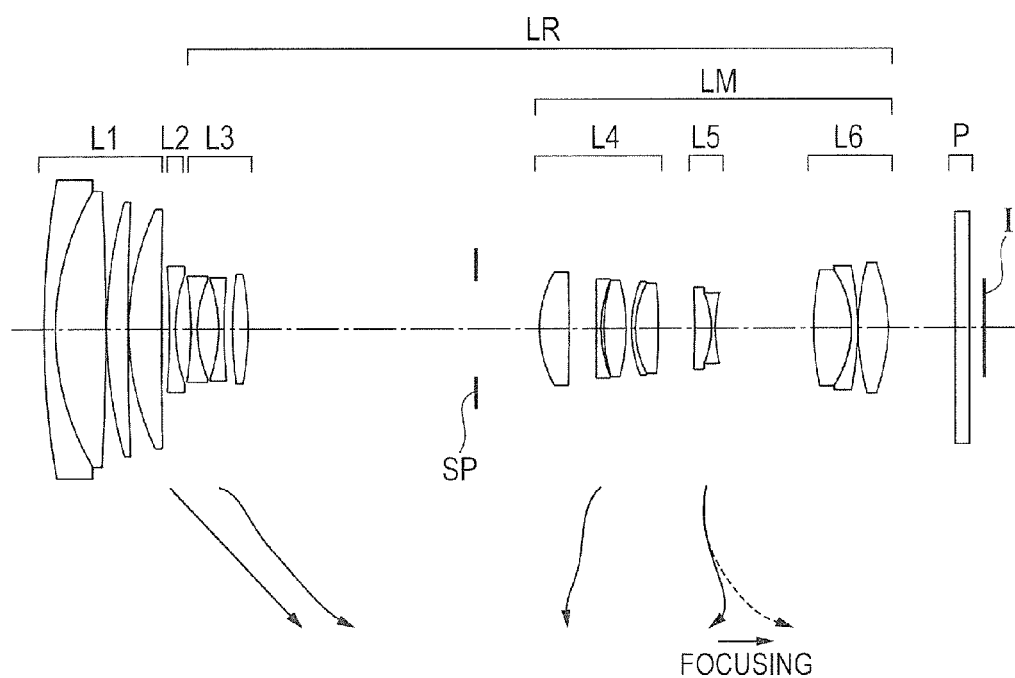
FIG. 5 is a lens cross-sectional view of a zoom lens according to Embodiment 3 of the present invention.
Figure 6A:
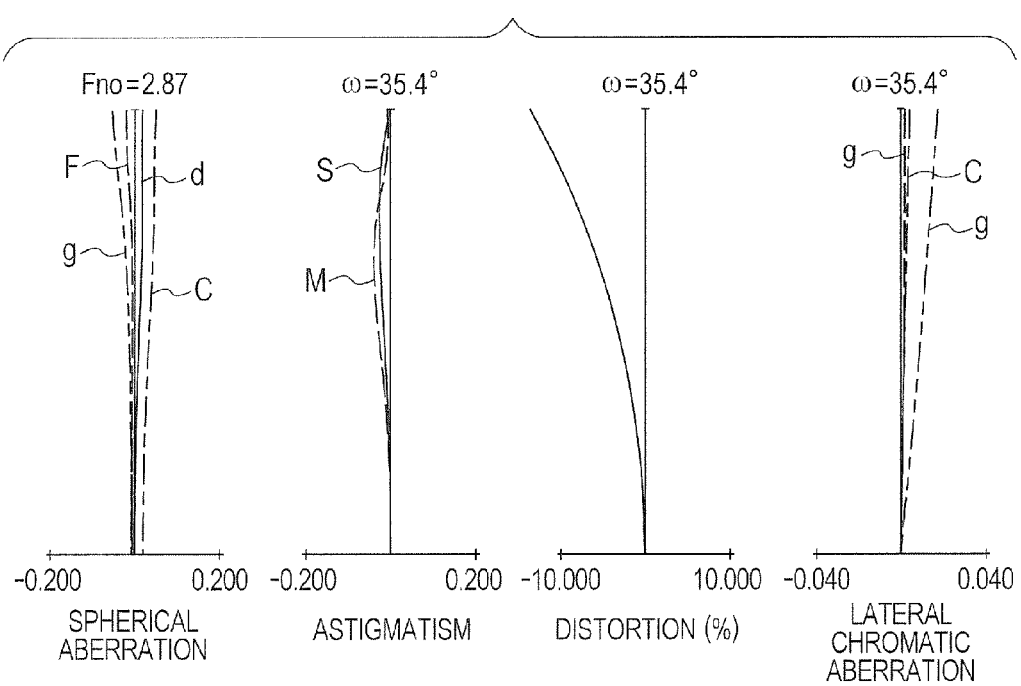
FIG. 6A is aberration diagrams of the zoom lens of Embodiment 3 at the wide angle end.
Figure 6B:
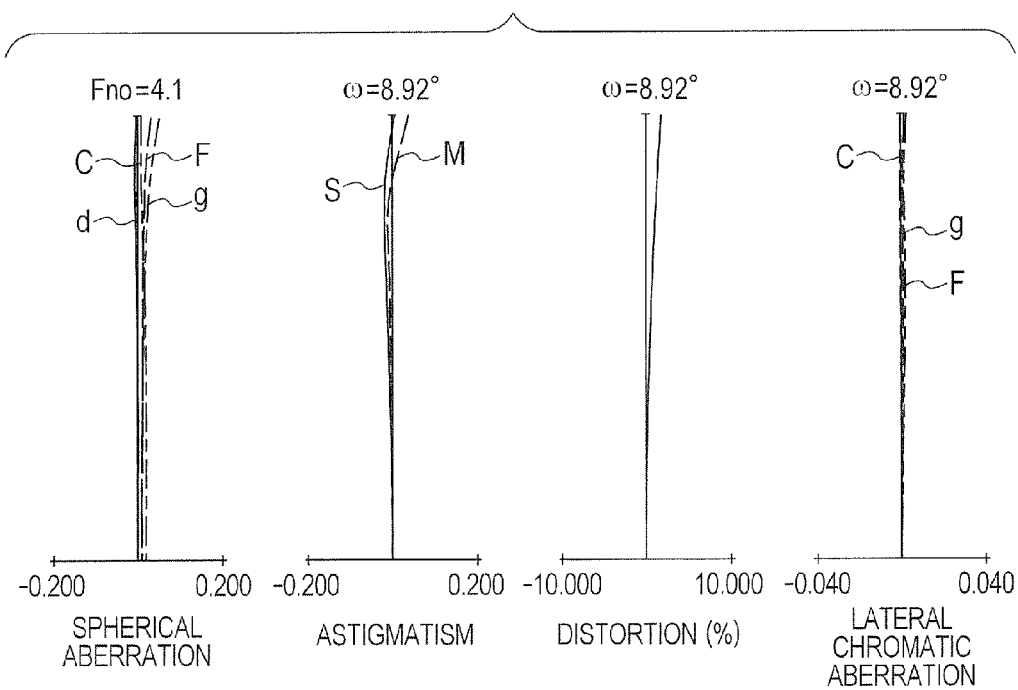
FIG. 6B is aberration diagrams of the zoom lens of Embodiment 3 at the intermediate zoom position.
Figure 6C:
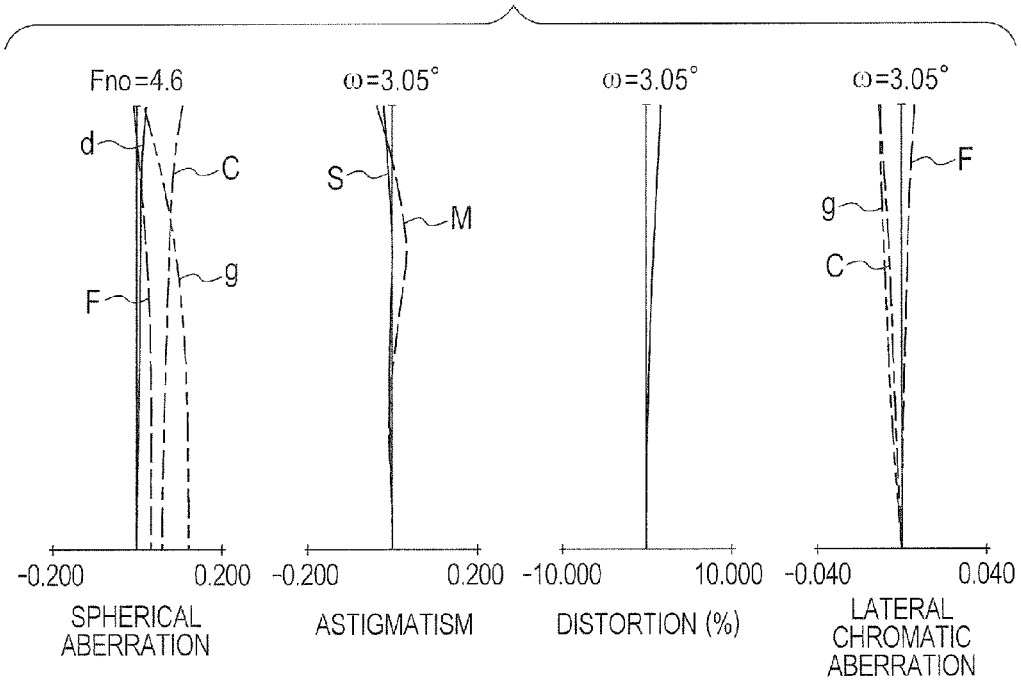
FIG. 6C is aberration diagrams of the zoom lens of Embodiment 3 at the telephoto end.
Figure 8B:
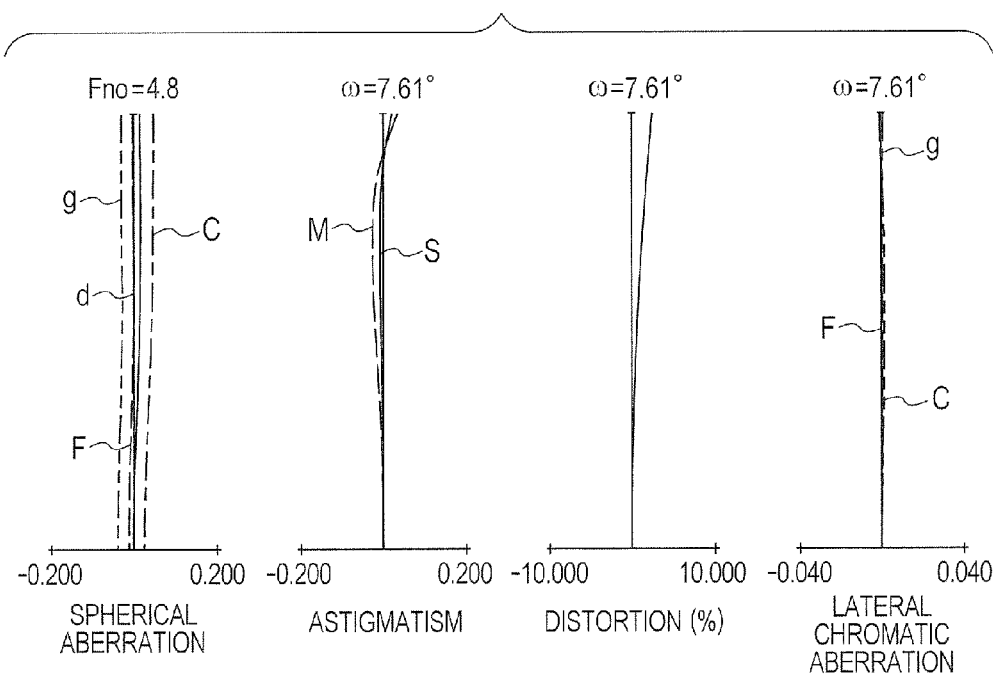
FIG. 8B is aberration diagrams of the zoom lens of Embodiment 4 at the intermediate zoom position.
Figure 8C:
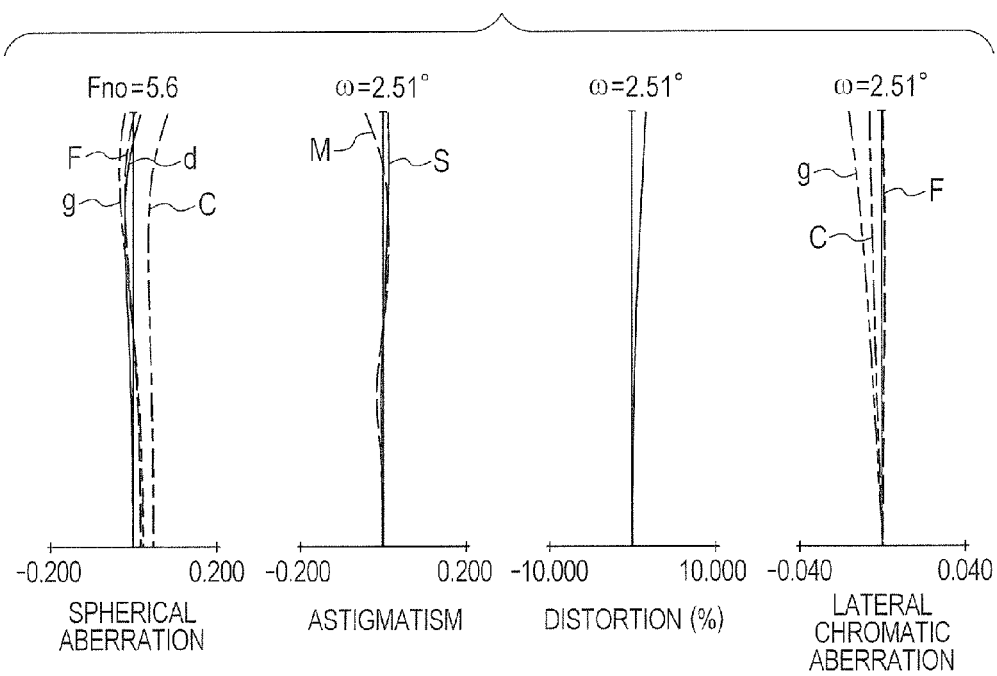
FIG. 8C is aberration diagrams of the zoom lens of Embodiment 4 at the telephoto end.

FIG. 5 is a lens cross-sectional view of a zoom lens according to Embodiment 3 of the present invention. FIG. 6A, FIG. 6B, and FIG. 6C are longitudinal aberration diagrams at the wide angle end, the intermediate zoom position, and the telephoto end, respectively, of the zoom lens according to Embodiment 3. The zoom lens according to Embodiment 3 has a zoom ratio of 13.00 and an F number of from 2.87 to 4.60. FIG. 7 is a lens cross-sectional view of a zoom lens according to Embodiment 4 of the present invention. FIG. 8A, FIG. 8B, and FIG. 8C are longitudinal aberration diagrams at the wide angle end, the intermediate zoom position, and the telephoto end, respectively, of the zoom lens according to Embodiment 4. The zoom lens according to Embodiment 4 has a zoom ratio of 20.00 and an F number of from 2.70 to 5.60.

Figure 9:
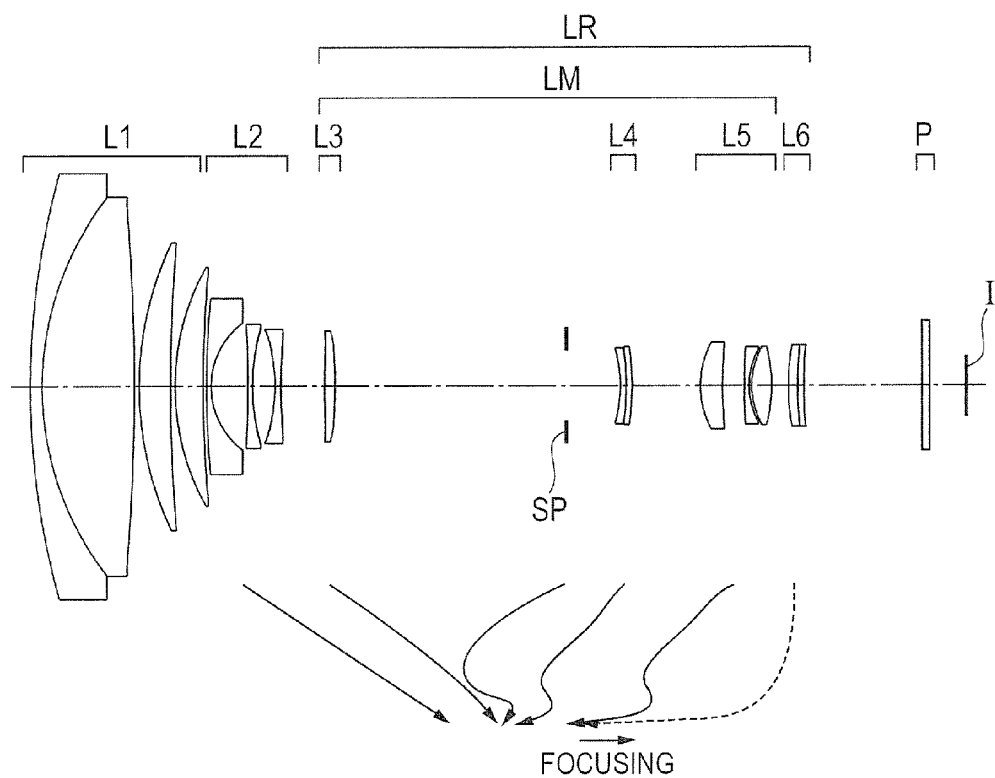
FIG. 9 is a lens cross-sectional view of a zoom lens according to Embodiment 5 of the present invention.
Figure 10A:
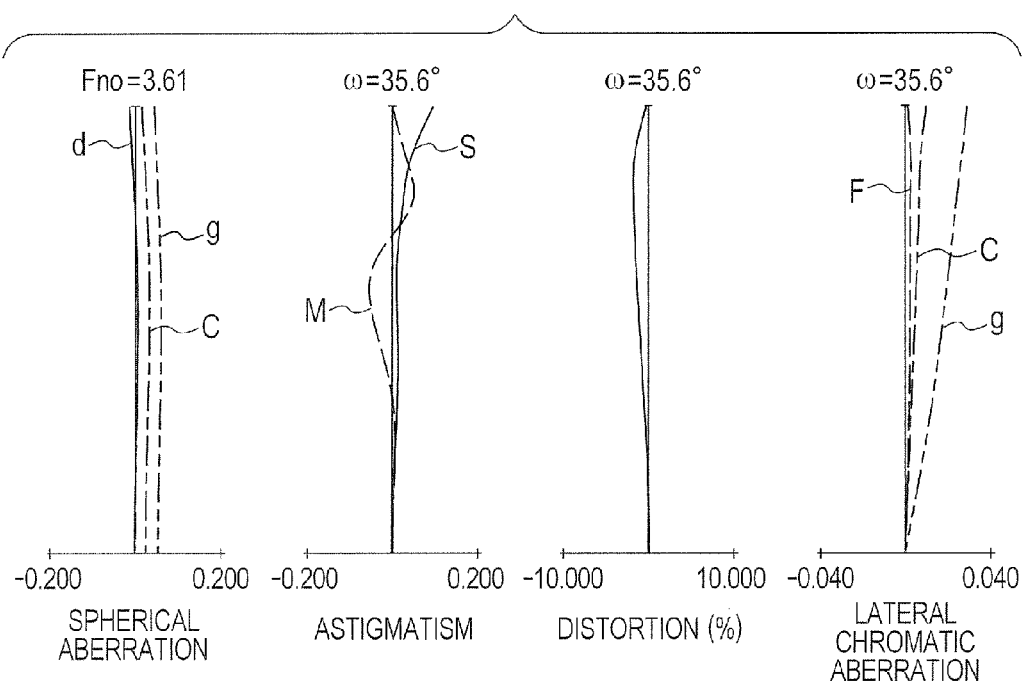
FIG. 10A is aberration diagrams of the zoom lens of Embodiment 5 at the wide angle end.
Figure 11:
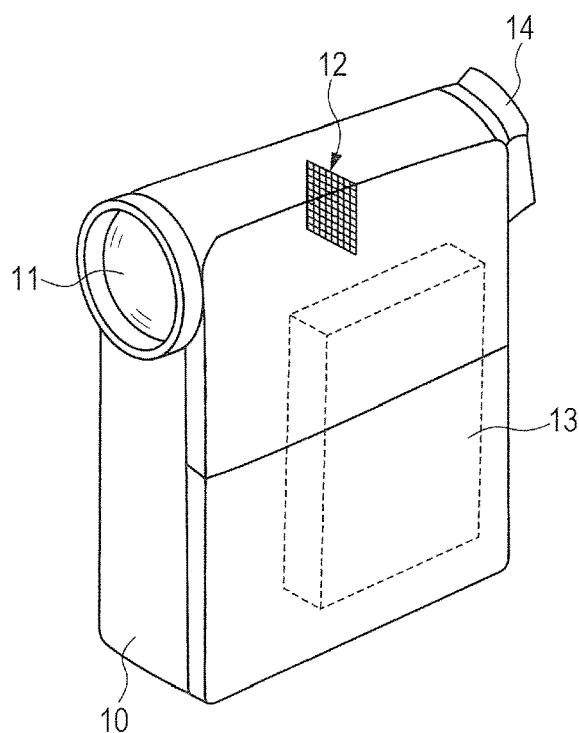
FIG. 11 is a view for illustrating an image pickup apparatus according to an embodiment of the present invention.
Figure 12:
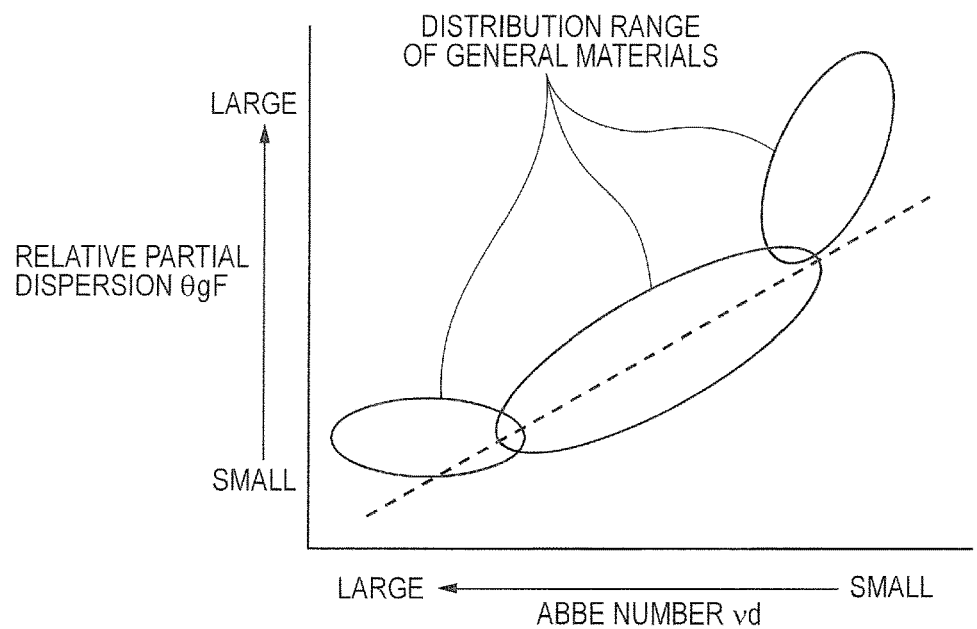
FIG. 12 is a relationship graph of an Abbe number and relative partial dispersion.

FIG. 9 is a lens cross-sectional view of a zoom lens according to Embodiment 5 of the present invention. FIG. 10A, FIG. 10B, and FIG. 10C are longitudinal aberration diagrams at the wide angle end, the intermediate zoom position, and the telephoto end, respectively, of the zoom lens according to Embodiment 5. The zoom lens according to Embodiment 5 has a zoom ratio of 19.50 and an F number of 3.61. FIG. 11 is a schematic view of a main part of an image pickup apparatus of the present invention. FIG. 12 is a relationship graph of Abbe numbers and relative partial dispersion of materials.

The zoom lens of each Embodiment is a zoom lens to be used in image pickup apparatus such as a digital camera, a video camera, a broadcasting camera, a monitoring camera, and a silver-halide film camera. The zoom lens of each Embodiment may also be used as a projection optical system for a projection apparatus (projector). In the lens cross-sectional views, the left side is the object side (front), and the right side is the image side (rear). Further, in the lens cross-sectional views, when the order of a lens unit from the object side is represented by i, the i-th lens unit is represented by Li.

A rear lens system LR includes a plurality of lens units. A sub lens system LM includes a lens unit A, a lens unit B, and a lens unit C and is included in the rear lens system LR. An aperture stop SP is also illustrated. An image plane IP corresponds to an image pickup surface of a solid-state image pickup element (photo-electric conversion element) such as a CCD sensor or a CMOS sensor when the zoom lens is used as an image pickup apparatus for a digital camera, a video camera, or the like. When the zoom lens is used as an image pickup apparatus of a silver-halide film camera, the image plane IP corresponds to a film surface. The arrows indicate movement directions of the lens units during zooming from the wide angle end to the telephoto end.

The arrow related to focusing indicates a movement direction of the lens unit during focusing from infinity to short distance. In the spherical aberration diagram, an F number is represented by Fno. Further, the solid line d represents a d-line (wavelength: 587.6 nm), and the two-dot chain line g represents a g-line (wavelength: 435.8 nm). The dashed-dotted line C represents a C-line (wavelength: 656.3 nm), and the dotted line F represents an F-line (wavelength: 486.1 nm). In the astigmatism diagram, the dotted line M represents a meridional image plane at the d-line and the solid line S represents a sagittal image plane at the d-line. The distortion aberration diagram is an illustration about the d-line. The lateral chromatic aberration diagram is an illustration of the g-line, the C-line, and the F-line. A half angle of view (degree) is represented by ω.

The zoom lens of the present invention includes, in order from the object side to the image side, a first lens unit L1 having a positive refractive power, and a second lens unit L2 having a negative refractive power. In addition, the zoom lens includes, on the image side of the second lens unit L2, the rear lens system LR including the plurality of lens units. The rear lens system LR includes the sub lens system LM including, in order from the object side to the image side, the lens unit A having a positive refractive power, the lens unit B having a negative refractive power, and the lens unit C having a positive refractive power. An interval between adjacent lens units is changed during zooming.

The zoom lens of the present invention includes the second lens unit L2 having a negative refractive power on the image plane side of the first lens unit L1 having a positive refractive power, and hence has a configuration suitable for increasing the zoom ratio. Further, the lens system on the image plane side of the second lens unit L2 includes the sub lens system including the lens unit A having a positive refractive power, the lens unit B having a negative refractive power, and the lens unit C having a positive refractive power, and hence axial chromatic aberration and lateral chromatic aberration are satisfactorily corrected. The first lens unit L1 is configured not to move during zooming so that the total lens length is not increased.

The lens unit A is configured to move during zooming to vary magnification or correct variation in position of the image plane accompanying magnification varying. In addition, the first lens unit L1 includes at least one positive lens and at least one negative lens. Further, the lens unit C includes at least one positive lens and at least one negative lens so that chromatic aberration is satisfactorily corrected.

The second lens unit L2 includes at least one negative lens. The lens unit B includes at least one positive lens. The average value of the Abbe numbers of the materials of positive lenses included in the first lens unit L1 is represented by ν1pave. The average value of the Abbe numbers of the materials of negative lenses included in the second lens unit L2 is represented by ν2nave. The average value of the Abbe numbers of the materials of positive lenses included in the lens unit B is represented by νBpave. The average value of the Abbe numbers of the materials of positive lenses included in the lens unit C is represented by νCpave.

In this case, the following conditional expressions are satisfied.

$$60.0 < \nu1pave < 95.0 \quad (1)$$

$$50.0 < \nu2nave < 90.0 \quad (2)$$

$$1.6 < \nu1pave/\nu Bpave < 5.0 \quad (3)$$

$$0.6 < \nu1pave/\nu Cpave < 1.4 \quad (4)$$

Each of the materials of the optical elements (lenses) used in each Embodiment has the following relative partial dispersion θgF and Abbe number νd. Refractive indices with respect to Fraunhofer lines of the g-line (435.8 nm), the F-line (486.1 nm), the d-line (587.6 nm), and the C-line (656.3 nm) are represented by Ng, NF, Nd, and NC, respectively. The Abbe number νd and the relative partial dispersion θgF with respect to the g-line and the F-line are expressed as Expression (a) and Expression (b), respectively.

$$\nu d = (Nd-1)/(NF-NC) \quad (a)$$

$$\theta gF = (Ng-NF)/(NF-NC) \quad (b)$$

The Abbe number νd of each of the materials of the lenses used in the present invention takes a value that is obtained through calculation about the material characteristics of the lens in question by Expression (a). Further, the relative partial dispersion θgF of each of the materials of the lenses takes a value that is obtained through calculation about the material characteristics of the lens in question by Expression (b).

Further, axial paraxial rays and pupil paraxial rays are rays defined as follows. The axial paraxial rays are paraxial rays that enter the optical system in parallel with the optical axis. The pupil paraxial rays are paraxial rays that enter an image pickup plane at the maximum image height and pass through the intersection between the entrance pupil and the optical axis of the optical system.

Next, the technical meanings of the above-mentioned conditional expressions are described. Conditional Expression (1) defines the Abbe number of the material of the positive lens included in the first lens unit L1. In the zoom lens of the present invention, axial paraxial rays enter the first lens unit L1 at high incident positions at the telephoto end. Thus, a material that satisfies Conditional Expression (1) and has a large Abbe number is used so that axial chromatic aberration is satisfactorily corrected at the telephoto end.

When the value exceeds the upper limit of Conditional Expression (1), the lens unit B and the lens unit C, which are described later, are not required, which is not preferred. When the value falls below the lower limit of Conditional Expression (1), it is difficult to correct axial chromatic aberration at the telephoto end.

Conditional Expression (2) defines the Abbe number of the material of the negative lens included in the second lens unit L2. The zoom lens of the present invention is configured to vary magnification mainly by changing a distance between the first lens unit L1 having a positive refractive power and the second lens unit L2 having a negative refractive power. For the negative lens included in the second lens unit L2, a material that satisfies Conditional Expression (2) and has a large Abbe number is used so that variation in lateral chromatic aberration accompanying zooming is particularly reduced. When the value exceeds the upper limit of Conditional Expression (2), the effect of correcting axial chromatic aberration is too small at the telephoto end, which is not preferred. When the value falls below the lower limit of Conditional Expression (2), it is difficult to correct lateral chromatic aberration particularly at the wide angle end.

In the zoom lens of each Embodiment, the lens unit A having a positive refractive power is arranged on the image side of the second lens unit L2 so that light fluxes exited from the lens unit A are converged, and increases in effective diameter of the subsequent lens system is thus prevented.

Conditional Expression (3) defines a relationship between the Abbe numbers of the materials of the positive lenses arranged in the first lens unit L1 and the lens unit B. Conditional Expression (4) defines a relationship between the Abbe numbers of the materials of the positive lenses arranged in the first lens unit L1 and the lens unit C. Now, Abbe numbers and relative partial dispersion of general materials are described. As shown in FIG. 12, the range of the relative partial dispersion θgF of available optical materials is limited depending on the Abbe number νd. Many kinds of glass materials are distributed near the dotted line (normal line) in FIG. 12, and the relative partial dispersion θgF tends to be larger with respect to the normal line in a portion in which the Abbe number νd is small or large.

Next, achromatization is described by taking the lens unit having a positive refractive power as an example. A material having a small Abbe number is used as the material of the negative lens of the lens unit having a positive refractive power, for the purpose of primary achromatization. Materials having a small Abbe number have, as described above, large relative partial dispersion, and hence the g-line tends to be excessively corrected over the entire zoom lens. In order to alleviate the excessive correction, it is effective to use a material having large relative partial dispersion as the material of the positive lens.

In this case, when Conditional Expression (1) is satisfied, the excessive correction of axial chromatic aberration at the g-line is alleviated particularly at the telephoto end, but the relative partial dispersion of materials having a large Abbe number is smaller than the relative partial dispersion of materials having a small Abbe number, and hence the alleviation is insufficient. To cope with this, the lens unit B is a lens unit having a negative refractive power, and the lens having a positive refractive power and a small Abbe number is arranged therein for achromatization so that the excessive correction of axial chromatic aberration at the g-line can be further alleviated at the telephoto end.

When a material that satisfies Conditional Expression (3) is selected, a material having a small Abbe number and large relative partial dispersion is used for the lens unit B, and hence the excessive correction of axial chromatic aberration at the g-line is alleviated at the telephoto end. When the ratio exceeds the upper limit of Conditional Expression (3), variation in axial chromatic aberration at the g-line is increased during zooming, which is not preferred. When the ratio falls below the lower limit of Conditional Expression (3), alleviation of the excessive correction of axial chromatic aberration at the g-line is insufficient at the telephoto end.

In a similar manner, in the second lens unit L2 having a negative refractive power, or when correction of chromatic aberration is insufficient, in the third lens unit L3 adjacent to the second lens unit L2, a positive lens made of a material having a small Abbe number and large relative partial dispersion tends to be used for achromatization. As a result, the excessive correction of axial chromatic aberration at the g-line is alleviated at the telephoto end. However, the second lens unit L2 is configured to move in an optical axis direction during zooming, and hence lateral chromatic aberration at the g-line is excessively corrected at the wide angle end.

In contrast to this, when Conditional Expression (1) is satisfied, lateral chromatic aberration at the g-line is more excessively corrected at the wide angle end. Pupil paraxial rays enter the lens unit B at low incident positions, and hence even when Conditional Expression (3) is satisfied, the effect of alleviating the excessive correction of lateral chromatic aberration at the g-line is small at the wide angle end. Thus, the relative partial dispersion of the material of the positive lens of the lens unit C is increased.

When a material that satisfies Conditional Expression (4) is selected, a material having a large Abbe number and large relative partial dispersion is used for the lens unit C, and hence the excessive correction of lateral chromatic aberration at the g-line is alleviated at the wide angle end. When the ratio exceeds the upper limit of Conditional Expression (4), alleviation of the excessive correction of lateral chromatic aberration at the g-line is insufficient at the wide angle end. When the ratio falls below the lower limit of Conditional Expression (4), alleviation of the excessive correction of lateral chromatic aberration at the g-line is too strong at the wide angle end.

Further, the first lens unit L1 includes at least one positive lens and at least one negative lens, and the lens unit C includes at least one positive lens and at least one negative lens. Axial paraxial rays enter the first lens unit L1 at high incident positions at the telephoto end, which greatly contributes to axial chromatic aberration, and pupil paraxial rays enter the lens unit C at high incident positions over the entire zoom range, which greatly contributes to lateral chromatic aberration. It is thus preferred to arrange the at least one positive lens and the at least one negative lens so that the chromatic aberrations are easily corrected.

The zoom lens, which is the object of the present invention, is achieved with the configuration described above. It is more preferred, however, that the following conditional expressions be satisfied.

An average value of the Abbe numbers of the materials of the negative lenses included in the first lens unit L1 is represented by ν1nave. The lens unit B includes negative lenses. An average value of the Abbe numbers of the materials of the negative lenses included in the lens unit B is represented by νBnave. The focal length of the first lens unit L1 is represented by f1, and a distance from the surface vertex of a lens surface closest to the object side of the first lens unit L1 to the image plane is represented by LD. The focal length of the lens unit C is represented by fC. The focal length of the lens unit B is represented by fB.

In this case, it is preferred that at least one of the following conditional expressions be satisfied.

$$1.8 < \nu1pave/\nu1nave < 4.0 \quad (5)$$

$$0.3 < \nu Bnave/\nu Cpave < 0.9 \quad (6)$$

$$0.2 < f1/LD < 0.5 \quad (7)$$

$$0.8 < f1/fC < 2.5 \quad (8)$$

$$-0.10 < (fB \times fC)/LD^2 < -0.02 \quad (9)$$

Next, the technical meanings of the above-mentioned conditional expressions are described. Conditional Expression (5) defines a ratio of the average value of the Abbe numbers of the materials of the positive lenses included in the first lens unit L1 to the average value of the Abbe numbers of the materials of the negative lenses included in the first lens unit L1.

In the zoom lens of the present invention, axial paraxial rays enter the first lens unit L1 at high incident positions particularly at the telephoto end, and it is required to perform primary chromatic aberration correction in the first lens unit L1 in order to reduce axial chromatic aberration. In addition, as the material of the first lens unit L1, a material having a large Abbe number, which is defined by Conditional Expression (1), is used, and such a material tends to have a low refractive index. A material that satisfies Conditional Expression (5) is accordingly used for the negative lens in the first lens unit L1 so that the curvature radius of the lens surface of the positive lens is increased and the generation of higher-order aberration is thus reduced, while the conditions for primary chromatic aberration correction are satisfied.

When the ratio exceeds the upper limit of Conditional Expression (5), a material having a small Abbe number and large relative partial dispersion is used for the negative lens in the first lens unit L1, and hence axial chromatic aberration at the g-line tends to be excessively corrected at the telephoto end. When the ratio falls below the lower limit of Conditional Expression (5), the curvature radius of the lens surface of the positive lens in the first lens unit L1 is reduced so that primary chromatic aberration correction is satisfactorily performed in the first lens unit L1, and hence it is difficult to correct higher-order aberration.

Conditional Expression (6) defines a ratio of the average value of the Abbe numbers of the materials of the negative lenses arranged in the lens unit B to the average value of the Abbe numbers of the materials of the positive lenses arranged in the lens unit C. In order to alleviate the excessive correction of axial chromatic aberration at the g-line at the telephoto end, a material having small relative partial dispersion is suitably used for the negative lens, and a material having large relative partial dispersion is suitably used for the positive lens.

Thus, a material that satisfies Conditional Expression (4) and has a large Abbe number and large relative partial dispersion is used for the positive lens of the lens unit C. In addition, when a material that satisfies Conditional Expression (6) is used for the negative lens in the lens unit B, the excessive correction of axial chromatic aberration can be satisfactorily alleviated.

When the ratio exceeds the upper limit of Conditional Expression (6), the relative partial dispersion of the negative lens in the lens unit B is increased, and hence axial chromatic aberration at the g-line is excessively corrected particularly at the telephoto end. When the ratio falls below the lower limit of Conditional Expression (6), a difference in Abbe numbers between the material of the positive lens and the material of the negative lens in the lens unit B cannot be sufficient. Then, the positive lens and the negative lens in the lens unit B are given too strong refractive powers in order to satisfy conditions for primary achromatization, leading to an increase in various aberrations, which is not preferred.

In Conditional Expression (7), the distance LD, which is the total lens length, takes a value obtained by adding the value of a back focus in air to the distance from the surface vertex of the lens surface closest to the object side to the surface vertex of the lens surface closest to the image side. Conditional Expression (7) defines a ratio of the focal length of the first lens unit L1 to the total lens length LD. In order to reduce the total lens length of the zoom lens, it is effective to reduce a telephoto ratio at the telephoto end, which is greatly affected by the positive refractive power of the first lens unit L1. When the positive refractive power of the first lens unit L1 is strong, the principal point is pushed toward the object side, and hence the total lens length is reduced under a condition that the focal length of the entire lens system is constant.

When the ratio exceeds the upper limit of Conditional Expression (7), as the positive refractive power of the first lens unit L1 is weakened, the telephoto ratio is increased at the telephoto end, with the result that it is difficult to reduce the total lens length. When the ratio falls below the lower limit of Conditional Expression (7), the curvature radius of the lens surface of the positive lens in the first lens unit L1 is reduced so that the positive lens in the first lens unit L1 has a strong refractive power, with the result that it is difficult to correct higher-order aberration.

Conditional Expression (8) defines a ratio of the focal length of the first lens unit L1 to the focal length of the lens unit C. As described above, when Conditional Expression (4) is satisfied, the excessive correction of lateral chromatic aberration at the g-line can be alleviated particularly at the wide angle end, but the lens unit C is required to have a suitable refractive power to sufficiently correct aberration. For example, when the positive refractive power of the first lens unit L1 is strong, lateral chromatic aberration at the g-line is corrected too much at the wide angle end, and hence it is required to increase the effect of alleviating the excessive correction by increasing the positive refractive power of the lens unit C.

When the positive refractive power of the lens unit C is increased so that Conditional Expression (8) is satisfied, the excessive correction of lateral chromatic aberration can be alleviated. When the ratio exceeds the upper limit of Conditional Expression (8), the alleviation is insufficient, and when the ratio falls below the lower limit, the alleviation is too strong.

Conditional Expression (9) defines a relationship between the total lens length, and the focal length of the lens unit B and the focal length of the lens unit C. As described above, pupil paraxial rays enter the lens unit C at high incident positions, and hence the lens unit C is suitable for alleviating the excessive correction of lateral chromatic aberration. In addition, the lens unit C also affects axial chromatic aberration, and hence when Conditional Expression (4) is satisfied, axial chromatic aberration at the g-line is moved in a direction in which the excessive correction is alleviated at the telephoto end.

Thus, when the positive refractive power of the lens unit C is strong, even if the negative refractive power of the lens unit B is relatively weak, the excessive correction of axial chromatic aberration at the g-line is easily alleviated at the telephoto end. Further, when the positive refractive power of the lens unit C is weak, it is difficult to sufficiently alleviate the excessive correction unless the lens unit B has a strong negative refractive power. When Conditional Expression (9) is satisfied, the excessive correction of axial chromatic aberration at the g-line is appropriately alleviated with ease at the telephoto end. When the ratio exceeds the upper limit of Conditional Expression (9), the excessive correction is alleviated too much, and when the ratio falls below the lower limit, the alleviation is insufficient.

It is more preferred to set the numerical value ranges of Conditional Expressions (1) to (9) as follows.

$$62.0 < v1pave < 92.0 \tag{1a}$$

$$51.0 < v2nave < 82.0 \tag{2a}$$

$$1.85 < v1pave/vBpave < 4.25 \tag{3a}$$

$$0.75 < v1pave/vCpave < 1.35 \tag{4a}$$

$$1.95 < v1pave/v1nave < 3.50 \tag{5a}$$

$$0.50 < vBnave/vCpave < 0.75 \tag{6a}$$

$$0.30 < f1/LD < 0.45 \tag{7a}$$

$$0.8 < f1/fC < 2.3 \tag{8a}$$

$$-0.085 < (fB \times fC)/LD^2 < -0.025 \tag{9a}$$

Further, in the zoom lens of the present invention, the first lens unit L1 desirably includes four or more lenses. In order to downsize the entire optical system, the first lens unit L1 preferably has a strong refractive power. Accordingly, in the present invention, the positive refractive power of the first lens unit L1 is achieved by the plurality of positive lenses, and hence the individual positive lenses have weak refractive powers. With this, the curvature radius of the lens surface of the positive lens is increased, and the generation of higher-order aberration is thus reduced.

Next, the rear lens system LR and the sub lens system LM included in the rear lens system LR of each Embodiment are described. In Embodiment 1, the rear lens system LR includes, in order from the object side to the image side, a third lens unit L3 having a positive refractive power, a fourth lens unit L4 having a negative refractive power, and a fifth lens unit L5 having a positive refractive power. The sub lens system LM includes the third lens unit L3, the fourth lens unit L4, and the fifth lens unit L5.

The third lens unit L3 corresponds to the lens unit A, the fourth lens unit L4 corresponds to the lens unit B, and the fifth lens unit L5 corresponds to the lens unit C. The second lens unit L2, the third lens unit L3, and the fourth lens unit L4 are configured to move during zooming. The fourth lens unit L4 is configured to move during focusing. The solid line and the dotted line related to the fourth lens unit L4 indicate movement loci for correcting image plane variation during zooming from the zoom position of the wide angle end to the zoom position of the telephoto end, when focusing at the infinity and the short distance.

For example, when focusing is performed from the infinity to the short distance at the zoom position of the telephoto end, the fourth lens unit L4 is moved backward toward the rear side as indicated by the arrow of focusing.

In Embodiment 2, the rear lens system LR includes, in order from the object side to the image side, a third lens unit L3 having a negative refractive power, a fourth lens unit L4 having a positive refractive power, a fifth lens unit L5 having a negative refractive power, and a sixth lens unit L6 having a positive refractive power. The sub lens system LM includes the fourth lens unit L4, the fifth lens unit L5, and the sixth lens unit L6.

The fourth lens unit L4 corresponds to the lens unit A, the fifth lens unit L5 corresponds to the lens unit B, and the sixth lens unit L6 corresponds to the lens unit C. The second lens unit L2, the third lens unit L3, and the fifth lens unit L5 are configured to move during zooming. The third lens unit L3 is configured to move during focusing. The solid line and the dotted line related to the third lens unit L3 indicate movement loci for correcting image plane variation during zooming from the zoom position of the wide angle end to the zoom position of the telephoto end, when focusing at the infinity and the short distance.

For example, when focusing is performed from the infinity to the short distance at the zoom position of the telephoto end, the third lens unit L3 is moved forward toward the object side as indicated by the arrow of focusing.

In Embodiment 3, the rear lens system LR includes, in order from the object side to the image side, a third lens unit L3 having a negative refractive power, a fourth lens unit L4 having a positive refractive power, a fifth lens unit L5 having a negative refractive power, and a sixth lens unit L6 having a positive refractive power. The sub lens system LM includes the fourth lens unit L4, the fifth lens unit L5, and the sixth lens unit L6.

The fourth lens unit L4 corresponds to the lens unit A, the fifth lens unit L5 corresponds to the lens unit B, and the sixth lens unit L6 corresponds to the lens unit C. The second lens unit L2, the third lens unit L3, the fourth lens unit L4, and the fifth lens unit L5 are configured to move during zooming. The fifth lens unit L5 is configured to move during focusing. The solid line and the dotted line related to the fifth lens unit L5 indicate movement loci for correcting image plane variation during zooming from the zoom position of the wide angle end to the zoom position of the telephoto end, when focusing at the infinity and the short distance.

For example, when focusing is performed from the infinity to the short distance at the zoom position of the telephoto end, the fifth lens unit L5 is moved backward toward the rear side as indicated by the arrow of focusing.

In Embodiment 4, the rear lens system LR includes, in order from the object side to the image side, a third lens unit L3 having a positive refractive power, a fourth lens unit L4 having a positive refractive power, a fifth lens unit L5 having a positive refractive power, a sixth lens unit L6 having a negative refractive power, and a seventh lens unit L7 having a positive refractive power. The sub lens system LM includes the fifth lens unit L5, the sixth lens unit L6, and the seventh lens unit L7.

The fifth lens unit L5 corresponds to the lens unit A, the sixth lens unit L6 corresponds to the lens unit B, and the seventh lens unit L7 corresponds to the lens unit C. The second lens unit L2, the third lens unit L3, the fourth lens unit L4, the five lens unit L5, and the sixth lens unit L6 are configured to move during zooming. The sixth lens unit L6 is configured to move during focusing. The solid line and the dotted line related to the sixth lens unit L6 indicate movement loci for correcting image plane variation during zooming from the zoom position of the wide angle end to the zoom position of the telephoto end, when focusing at the infinity and the short distance.

For example, when focusing is performed from the infinity to the short distance at the zoom position of the telephoto end, the sixth lens unit L6 is moved backward toward the rear side as indicated by the arrow of focusing.

In Embodiment 5, the rear lens system LR includes, in order from the object side to the image side, a third lens unit L3 having a positive refractive power, a fourth lens unit L4 having a negative refractive power, a fifth lens unit L5 having a positive refractive power, and a sixth lens unit L6 having a positive refractive power. The sub lens system LM includes the third lens unit L3, the fourth lens unit L4, and the fifth lens unit L5.

The third lens unit L3 corresponds to the lens unit A, the fourth lens unit L4 corresponds to the lens unit B, and the fifth lens unit L5 corresponds to the lens unit C. The second lens unit L2, the third lens unit L3, and the fifth lens unit L5 are configured to move during zooming. The fifth lens unit L5 is configured to move during focusing. The solid line and the dotted line related to the fifth lens unit L5 indicate movement loci for correcting image plane variation during zooming from the zoom position of the wide angle end to the zoom position of the telephoto end, when focusing at the infinity and the short distance.

For example, when focusing is performed from the infinity to the short distance at the zoom position of the telephoto end, the fifth lens unit L5 is moved backward toward the rear side as indicated by the arrow of focusing.

Next, description is given on a video camera according to an embodiment of the present invention that uses the zoom lens of the present invention as an imaging optical system, with reference to FIG. 11. In FIG. 11, there are illustrated a video camera body 10, an imaging optical system 11 being the zoom lens of the present invention, and an image pickup element 12, for example, a CCD, which is configured to receive an object image through the imaging optical system 11. A recording unit 13 is configured to record an object image received by the image pickup element 12, and a finder 14 is used for observation of an object image displayed on a display element (not shown). The display element includes a liquid crystal panel, for example, and is configured to display an object image formed on the image pickup element 12.

Through application of the zoom lens of the present invention to an image pickup apparatus, for example, a video camera in this manner, a compact image pickup apparatus having high optical characteristics can be achieved. When an electronic image pickup element, for example, a CCD is used as the image pickup element, the quality of output images can be further improved by electronically correct aberration.

While the exemplary embodiments of the present invention are described above, the present invention is not limited to those embodiments and can be modified and changed variously within the scope of the gist thereof.

Specific numerical data 1 to 5 corresponding to Embodiments 1 to 5 are described below. In each Embodiment, i indicates the order from the object side, ri indicates the curvature radius of an i-th optical surface (i-th surface), di indicates an on-axis interval between the i-th surface and an (i+1)th surface, and ndi and νdi indicate the refractive index and Abbe number of a material of an optical member between the i-th surface and the (i+1)th surface with respect to the d-line, respectively. An aspherical shape is expressed by the following equation:

$$X = \frac{H^2/R}{1+\sqrt{1-(1+K)(H/R)^2}} + A4H^4 + A6H^6 + A8H^8$$

where the X-axis represents an optical axis direction, the H-axis represents an axis in a direction perpendicular to the optical axis, a traveling direction of light is positive, R represents a paraxial curvature radius, K represents a conic constant, and A4, A6, and A8 represent aspherical coefficients.

The asterisk (*) indicates a surface having an aspherical shape. The notation "e-x" indicates ×10$^{-x}$. In the numerical data, the last two surfaces are surfaces of an optical block such as a filter or a face plate. The notation "BF" indicates a back focus in air. The total lens length is a value obtained by adding the back focus BF to a distance from the first lens surface to the last lens surface. Moreover, a relationship between Conditional Expressions described above and Embodiments is shown in Table 1.

[Numerical Data 1]

| | Unit mm | | | |
|---|---|---|---|---|
| | Surface data | | | |
| Surface number | r | d | nd | νd |
| 1 | 214.090 | 1.47 | 1.91650 | 31.6 |
| 2 | 40.748 | 6.31 | 1.43875 | 94.9 |
| 3 | −189.371 | 0.17 | | |
| 4 | 92.942 | 1.78 | 1.76385 | 48.5 |
| 5 | 196.508 | 0.17 | | |
| 6 | 41.556 | 4.60 | 1.76385 | 48.5 |
| 7 | 5,650.182 | (Variable) | | |
| 8 | −3,933.506 | 0.82 | 1.83481 | 42.7 |
| 9 | 11.758 | 4.18 | | |
| 10* | 1462.054 | 0.62 | 1.58313 | 59.5 |
| 11* | 44.234 | 3.40 | | |
| 12 | −13.983 | 0.62 | 1.43700 | 95.1 |
| 13 | −156.680 | 0.17 | | |
| 14 | 108.152 | 1.81 | 1.92286 | 18.9 |
| 15 | −57.051 | (Variable) | | |
| 16 (Stop) | ∞ | (Variable) | | |
| 17* | 16.081 | 4.41 | 1.58313 | 59.4 |
| 18* | −89.455 | 3.06 | | |
| 19 | 90.014 | 0.63 | 1.83400 | 37.2 |
| 20 | 17.078 | 1.20 | | |
| 21 | 34.311 | 2.64 | 1.43700 | 95.1 |
| 22 | −48.019 | 0.50 | | |
| 23 | 20.461 | 0.68 | 1.95375 | 32.3 |
| 24 | 13.960 | 4.01 | 1.53775 | 74.7 |
| 25 | −72.479 | (Variable) | | |
| 26 | −56.965 | 1.22 | 2.00069 | 25.5 |
| 27 | −22.518 | 0.83 | 1.69680 | 55.5 |
| 28 | 20.737 | (Variable) | | |
| 29 | 215.424 | 4.31 | 1.49700 | 81.5 |
| 30 | −17.616 | 0.75 | 2.00069 | 25.5 |
| 31 | −33.477 | 0.17 | | |
| 32 | 28.721 | 4.39 | 1.53775 | 74.7 |
| 33 | −48.020 | 5.31 | | |
| 34 | ∞ | 2.00 | 1.51633 | 64.1 |
| 35 | ∞ | 7.16 | | |
| Image plane | ∞ | | | |

| Aspherical surface data |
|---|
| Tenth surface |

K = 2.67819e+004　　A4 = 8.01158e−005　　A6 = −2.29086e−006
A8 = 1.12970e−008

| Eleventh surface |
|---|

K = 1.63872e+001　　A4 = 2.03794e−005　　A6 = −2.52446e−006
A8 = 1.14776e−008

| Seventeenth surface |
|---|

K = −2.36021e−001　　A4 = −1.27121e−005　　A6 = −1.17494e−008
A8 = −8.03485e−011

| Eighteenth surface |
|---|

K = −4.62882e+001　　A4 = 6.13863e−006　　A6 = −1.72511e−009
A8 = −1.94674e−011

| Various data | | | |
|---|---|---|---|
| Zoom ratio 14.55 | | | |
| | Wide angle | Intermediate | Telephoto |
| Focal length | 8.76 | 52.08 | 127.38 |
| F number | 2.88 | 3.74 | 4.64 |
| Half angle of view (degree) | 36.37 | 8.10 | 3.33 |
| Image height | 6.45 | 7.41 | 7.41 |
| Total lens length | 139.25 | 139.25 | 139.25 |
| BF | 13.79 | 13.79 | 13.79 |
| d7 | 0.72 | 24.55 | 34.76 |
| d15 | 35.84 | 12.01 | 1.80 |
| d16 | 14.36 | 0.70 | 0.70 |
| d25 | 3.14 | 16.56 | 16.26 |
| d28 | 16.45 | 16.69 | 16.99 |

| Zoom lens unit data | | |
|---|---|---|
| Unit | First surface | Focal length |
| 1 | 1 | 54.97 |
| 2 | 8 | −11.08 |
| 3 | 16 | ∞ |
| 4 | 17 | 22.48 |
| 5 | 26 | −26.35 |
| 6 | 29 | 30.15 |
| 7 | 34 | ∞ |

[Numerical Data 2]

| | Unit mm | | | |
|---|---|---|---|---|
| | Surface data | | | |
| Surface number | r | d | nd | νd |
| 1 | 134.907 | 2.00 | 1.91650 | 31.6 |
| 2 | 56.010 | 8.82 | 1.49700 | 81.5 |
| 3 | −339.631 | 0.17 | | |
| 4 | 52.073 | 5.63 | 1.49700 | 81.5 |

-continued

| Unit mm | | | | |
|---|---|---|---|---|
| 5 | 390.752 | 0.17 | | |
| 6 | 41.702 | 4.74 | 1.53775 | 74.7 |
| 7 | 120.887 | (Variable) | | |
| 8 | 259.396 | 0.90 | 1.83481 | 42.7 |
| 9 | 10.961 | 7.56 | | |
| 10* | −23.977 | 0.69 | 1.48749 | 70.2 |
| 11* | 35.396 | 0.51 | | |
| 12 | 46.043 | 3.04 | 1.95906 | 17.5 |
| 13 | −41.114 | (Variable) | | |
| 14 | −21.075 | 0.59 | 1.91650 | 31.6 |
| 15 | −221.424 | (Variable) | | |
| 16 (Stop) | ∞ | 1.08 | | |
| 17* | 12.649 | 3.29 | 1.58573 | 59.7 |
| 18* | −858.606 | 0.37 | | |
| 19 | 16.800 | 0.84 | 1.95375 | 32.3 |
| 20 | 11.630 | 0.50 | | |
| 21 | 14.196 | 3.50 | 1.43875 | 94.9 |
| 22 | −40.634 | 0.51 | | |
| 23 | 35.036 | 0.60 | 1.88300 | 40.8 |
| 24 | 9.382 | 3.63 | 1.51742 | 52.4 |
| 25 | −61.262 | (Variable) | | |
| 26 | 45.161 | 1.15 | 1.92286 | 18.9 |
| 27 | −68.589 | 0.60 | 1.95375 | 32.3 |
| 28 | 15.847 | (Variable) | | |
| 29 | 101.148 | 3.41 | 1.53775 | 74.7 |
| 30 | −9.045 | 0.60 | 1.75500 | 52.3 |
| 31 | 30.237 | 2.76 | | |
| 32 | 32.332 | 4.09 | 1.54814 | 45.8 |
| 33 | −16.035 | 3.79 | | |
| 34 | ∞ | 2.00 | 1.51633 | 64.1 |
| 35 | ∞ | 7.15 | | |
| Image plane | ∞ | | | |

Aspherical surface data

Tenth surface

K = −1.53964e+000  A4 = −1.42098e−005  A6 = −1.39049e−007
A8 = −1.91171e−009

Eleventh surface

K = 7.04768e+000  A4 = −8.74385e−005  A6 = −2.03199e−007
A8 = −1.83212e−009

Seventeenth surface

K = −6.96897e−001  A4 = 1.17324e−005  A6 = 5.11310e−008
A8 = 3.00329e−010

Eighteenth surface

K = −8.96688e+003  A4 = 5.22479e−005  A6 = −8.08572e−008
A8 = −5.23661e−011

Various data
Zoom ratio 19.49

| | Wide angle | Intermediate | Telephoto |
|---|---|---|---|
| Focal length | 11.15 | 55.61 | 217.27 |
| F number | 4.12 | 4.63 | 4.84 |
| Half angle of view (degree) | 34.15 | 7.37 | 1.95 |
| Image height | 7.41 | 7.41 | 7.41 |
| Total lens length | 139.38 | 139.38 | 139.38 |
| BF | 12.26 | 12.26 | 12.26 |
| d7 | 0.95 | 25.36 | 35.82 |
| d13 | 8.94 | 9.37 | 8.97 |
| d15 | 37.01 | 12.17 | 2.11 |
| d25 | 0.49 | 13.37 | 11.29 |
| d28 | 17.99 | 5.11 | 7.19 |

Zoom lens unit data

| Unit | First surface | Focal length |
|---|---|---|
| 1 | 1 | 57.21 |
| 2 | 8 | −20.17 |
| 3 | 14 | −25.45 |

-continued

| Unit mm | | |
|---|---|---|
| 4 | 16 | ∞ |
| 5 | 17 | 17.44 |
| 6 | 26 | −25.58 |
| 7 | 29 | 62.88 |
| 8 | 34 | ∞ |

[Numerical Data 3]

| Unit mm | | | | |
|---|---|---|---|---|
| Surface data | | | | |
| Surface number | r | d | nd | vd |
| 1 | 134.393 | 1.73 | 1.91650 | 31.6 |
| 2 | 41.368 | 7.67 | 1.43875 | 94.9 |
| 3 | −395.541 | 0.15 | | |
| 4 | 71.513 | 3.20 | 1.43875 | 94.9 |
| 5 | 463.188 | 0.13 | | |
| 6 | 43.012 | 4.95 | 1.76385 | 48.5 |
| 7 | 1,399.112 | (Variable) | | |
| 8 | −123.122 | 0.86 | 1.75500 | 52.3 |
| 9 | 25.247 | (Variable) | | |
| 10* | −48.716 | 0.95 | 2.00100 | 29.1 |
| 11* | 17.846 | 3.24 | | |
| 12 | −22.718 | 0.80 | 1.43875 | 94.9 |
| 13 | 77.024 | 1.28 | | |
| 14 | 59.449 | 2.38 | 1.92286 | 18.9 |
| 15 | −45.673 | (Variable) | | |
| 16 (Stop) | ∞ | (Variable) | | |
| 17* | 17.355 | 4.47 | 1.58313 | 59.4 |
| 18* | −252.397 | 4.15 | | |
| 19 | 7,766.941 | 0.70 | 1.83400 | 37.2 |
| 20 | 19.536 | 0.44 | | |
| 21 | 26.557 | 3.38 | 1.43875 | 94.9 |
| 22 | −29.192 | 0.80 | | |
| 23 | 20.147 | 0.58 | 1.95375 | 32.3 |
| 24 | 14.447 | 3.52 | 1.48749 | 70.2 |
| 25 | −91.245 | (Variable) | | |
| 26 | −123.808 | 2.51 | 1.84666 | 23.8 |
| 27 | −13.574 | 0.58 | 1.78590 | 44.2 |
| 28 | 23.406 | (Variable) | | |
| 29 | 32.598 | 5.90 | 1.48749 | 70.2 |
| 30 | −15.682 | 0.77 | 2.00069 | 25.5 |
| 31 | −49.686 | 0.17 | | |
| 32 | 38.063 | 4.46 | 1.48749 | 70.2 |
| 33 | −27.437 | 10.16 | | |
| 34 | ∞ | 2.00 | 1.51633 | 64.1 |
| 35 | ∞ | 3.95 | | |
| Image plane | ∞ | | | |

Aspherical surface data

Tenth surface

K = 0.00000e+000  A4 = 1.79074e−005  A6 = −2.25311e−007
A8 = 2.23331e−009

Eleventh surface

K = 0.00000e+000  A4 = −1.85202e−005  A6 = −2.97240e−007
A8 = 3.55529e−009

Seventeenth surface

K = 0.00000e+000  A4 = −9.85475e−006  A6 = −3.15564e−008
A8 = 7.77260e−011

Eighteenth surface

K = 0.00000e+000  A4 = 1.69516e−005  A6 = −3.61467e−008
A8 = 1.94911e−010

Various data
Zoom ratio 13.00

| | Wide angle | Intermediate | Telephoto |
|---|---|---|---|

-continued

Unit mm

| Focal length | 10.50 | 46.28 | 136.46 |
|---|---|---|---|
| F number | 2.87 | 4.10 | 4.60 |
| Half angle of view (degree) | 35.40 | 8.92 | 3.05 |
| Image height | 6.45 | 7.41 | 7.41 |
| Total lens length | 142.96 | 142.96 | 142.96 |
| BF | 15.43 | 15.43 | 15.43 |
| d7 | 1.23 | 23.60 | 33.19 |
| d9 | 2.37 | 0.80 | 3.59 |
| d15 | 34.45 | 13.66 | 1.28 |
| d16 | 9.61 | 3.05 | 1.59 |
| d25 | 5.52 | 15.91 | 13.60 |
| d28 | 14.57 | 10.75 | 14.52 |

Zoom lens unit data

| Unit | First surface | Focal length |
|---|---|---|
| 1 | 1 | 52.00 |
| 2 | 8 | −27.68 |
| 3 | 10 | −18.24 |
| 4 | 16 | ∞ |
| 5 | 17 | 24.53 |
| 6 | 26 | −27.60 |
| 7 | 29 | 31.90 |
| 8 | 34 | ∞ |

[Numerical Data 4]

Unit mm

Surface data

| Surface number | r | d | nd | vd |
|---|---|---|---|---|
| 1 | 89.736 | 1.62 | 1.90366 | 31.3 |
| 2 | 53.787 | 8.35 | 1.43875 | 94.9 |
| 3 | −360.137 | 0.17 | | |
| 4 | 57.306 | 2.47 | 1.43875 | 94.9 |
| 5 | 133.621 | 0.17 | | |
| 6 | 45.781 | 3.44 | 1.49700 | 81.5 |
| 7 | 239.700 | (Variable) | | |
| 8 | −467.751 | 0.90 | 1.88300 | 40.8 |
| 9 | 13.276 | 4.20 | | |
| 10* | 21,820.281 | 1.00 | 1.58313 | 59.4 |
| 11* | 46.904 | 2.98 | | |
| 12 | −17.276 | 0.60 | 1.43875 | 94.9 |
| 13 | 154.536 | (Variable) | | |
| 14 | 112.378 | 2.01 | 1.92286 | 18.9 |
| 15 | −68.622 | (Variable) | | |
| 16 (Stop) | ∞ | (Variable) | | |
| 17* | 16.670 | 5.14 | 1.61800 | 63.3 |
| 18* | −118.283 | 4.48 | | |
| 19 | 217.419 | 0.63 | 1.88300 | 40.8 |
| 20 | 16.052 | 0.74 | | |
| 21 | 20.759 | 3.54 | 1.43875 | 94.9 |
| 22 | −25.005 | (Variable) | | |
| 23 | 16.590 | 0.60 | 1.95375 | 32.3 |
| 24 | 13.189 | 2.35 | 1.48749 | 70.2 |
| 25 | 104.354 | (Variable) | | |
| 26 | 711.767 | 1.67 | 1.80810 | 22.8 |
| 27 | −26.063 | 0.82 | 1.80440 | 39.6 |
| 28 | 17.230 | (Variable) | | |
| 29 | 73.956 | 3.34 | 1.48749 | 70.2 |
| 30 | −25.528 | 0.73 | 2.00069 | 25.5 |
| 31 | −52.147 | 0.17 | | |
| 32 | 32.672 | 4.16 | 1.48749 | 70.2 |
| 33 | −39.082 | 4.00 | | |
| 34 | ∞ | 1.80 | 1.51633 | 64.1 |
| 35 | ∞ | 8.00 | | |
| Image plane | ∞ | | | |

-continued

Unit mm

Aspherical surface data

Tenth surface

K = 5.39028e+006    A4 = −1.82962e−005    A6 = −4.48361e−007
A8 = 2.95368e−009

Eleventh surface

K = 4.32864e+000    A4 = −5.14581e−005    A6 = −4.88755e−007
A8 = 3.10878e−009

Seventeenth surface

K = −1.28382e+000    A4 = 2.47991e−005    A6 = 1.66560e−008
A8 = 2.06515e−010

Eighteenth surface

K = −1.68527e+002    A4 = 1.03078e−005    A6 = 3.15440e−008
A8 = −6.44408e−011

Various data
Zoom ratio 20.00

| | Wide angle | Intermediate | Telephoto |
|---|---|---|---|
| Focal length | 8.30 | 54.09 | 166.00 |
| F number | 2.70 | 4.80 | 5.60 |
| Half angle of view (degree) | 41.84 | 7.61 | 2.51 |
| Image height | 6.45 | 7.41 | 7.41 |
| Total lens length | 149.37 | 149.37 | 149.37 |
| BF | 13.19 | 13.19 | 13.19 |
| d7 | 0.78 | 28.30 | 40.09 |
| d13 | 0.92 | 1.21 | 1.98 |
| d15 | 41.12 | 13.31 | 0.74 |
| d16 | 20.27 | 3.65 | 0.85 |
| d22 | 2.56 | 4.42 | 0.75 |
| d25 | 2.30 | 13.26 | 14.17 |
| d28 | 11.95 | 15.76 | 21.31 |
| d33 | 4.00 | 4.00 | 4.00 |
| d35 | 8.00 | 8.00 | 8.00 |

Zoom lens unit data

| Unit | First surface | Focal length |
|---|---|---|
| 1 | 1 | 64.12 |
| 2 | 8 | −7.70 |
| 3 | 14 | 46.41 |
| 4 | 16 | ∞ |
| 5 | 17 | 30.99 |
| 6 | 23 | 54.52 |
| 7 | 26 | −22.06 |
| 8 | 29 | 31.09 |
| 9 | 34 | ∞ |

[Numerical Data 5]

Unit mm

Surface data

| Surface number | r | d | nd | vd |
|---|---|---|---|---|
| 1 | 202.557 | 2.98 | 1.88300 | 40.8 |
| 2 | 78.264 | 23.32 | 1.49700 | 81.5 |
| 3 | −561.279 | 1.19 | | |
| 4 | 85.730 | 7.92 | 1.49700 | 81.5 |
| 5 | 450.175 | 1.11 | | |
| 6 | 62.379 | 7.15 | 1.49700 | 81.5 |
| 7 | 337.615 | (Variable) | | |
| 8 | 263.800 | 1.10 | 1.77250 | 49.6 |
| 9 | 20.238 | 9.32 | | |
| 10 | −342.665 | 1.17 | 1.43875 | 94.9 |
| 11 | 53.483 | 5.69 | | |
| 12* | −38.190 | 1.52 | 1.43875 | 94.9 |

-continued

Unit mm

| | | | | |
|---|---|---|---|---|
| 13* | 250.051 | (Variable) | | |
| 14* | 121.858 | 2.63 | 1.95906 | 17.5 |
| 15* | −264.222 | (Variable) | | |
| 16 (Stop) | ∞ | (Variable) | | |
| 17 | −36.315 | 1.49 | 1.83481 | 42.7 |
| 18 | −80.921 | 1.49 | 1.71999 | 50.2 |
| 19 | −73.468 | (Variable) | | |
| 20* | 22.716 | 5.59 | 1.71300 | 53.9 |
| 21 | 111.080 | 5.59 | | |
| 22 | 213.598 | 1.19 | 1.80100 | 35.0 |
| 23 | 19.844 | 0.63 | | |
| 24* | 18.543 | 5.05 | 1.43875 | 94.9 |
| 25 | −40.302 | (Variable) | | |
| 26 | 50.377 | 2.31 | 1.73400 | 51.5 |
| 27 | 237.179 | 1.42 | 1.49700 | 81.5 |
| 28 | 144.761 | 30.00 | | |
| 29 | ∞ | 1.80 | 1.51633 | 64.1 |
| 30 | ∞ | 9.11 | | |
| Image plane | ∞ | | | |

Aspherical surface data

Twelfth surface

K = −1.33698e+001  A4 = 7.42946e−006  A6 = −8.57142e−008
A8 = −4.61911e−011

Thirteenth surface

K = 2.41634e+002  A4 = 2.49801e−005  A6 = −1.28930e−007
A8 = −2.71810e−011

Fourteenth surface

K = 3.69940e+001  A4 = −1.22378e−005  A6 = −1.37613e−008
A8 = −2.29172e−010

Fifteenth surface

K = −7.81325e+002  A4 = −1.33860e−005  A6 = −1.25441e−008
A8 = −1.57233e−010

Twentieth surface

K = 4.69045e−001  A4 = −7.13347e−006  A6 = −1.55786e−008
A8 = −6.16238e−011

Twenty-fourth surface

K = 1.65915e−001  A4 = −3.14013e−005  A6 = −1.25096e−008
A8 = −1.10245e−010

Various data
Zoom ratio 19.50

| | Wide angle | Intermediate | Telephoto |
|---|---|---|---|
| Focal length | 10.31 | 61.89 | 201.07 |
| F number | 3.61 | 3.61 | 3.61 |
| Half angle of view (degree) | 35.58 | 6.78 | 2.12 |
| Image height | 7.41 | 7.41 | 7.41 |
| Total lens length | 235.79 | 235.79 | 235.79 |
| BF | 40.30 | 40.30 | 40.30 |
| d7 | 0.87 | 41.58 | 51.76 |
| d13 | 10.99 | 5.95 | 1.49 |
| d15 | 58.36 | 2.81 | 1.11 |
| d16 | 13.75 | 14.60 | 2.32 |
| d19 | 17.24 | 15.72 | 3.00 |
| d25 | 4.43 | 24.97 | 45.94 |

Zoom lens unit data

| Unit | First surface | Focal length |
|---|---|---|
| 1 | 1 | 87.52 |
| 2 | 8 | −14.35 |
| 3 | 14 | 87.25 |
| 4 | 16 | ∞ |
| 5 | 17 | −87.90 |
| 6 | 20 | 42.40 |
| 7 | 26 | 97.39 |
| 8 | 29 | ∞ |

TABLE 1

| | Embodiment | | | | |
|---|---|---|---|---|---|
| Conditional Expression | 1 (PNPNP) | 2 (PNNPNP) | 3 (PNNPNP) | 4 (PNPPPNP) | 5 (PNPNPP) |
| (1) | 63.967 | 79.260 | 79.433 | 90.457 | 81.540 |
| (2) | 66.100 | 56.480 | 52.320 | 65.033 | 79.820 |
| (3) | 2.508 | 4.194 | 3.338 | 3.967 | 1.908 |
| (4) | 0.819 | 1.316 | 1.132 | 1.289 | 1.096 |
| (5) | 2.024 | 2.508 | 2.514 | 2.890 | 2.000 |
| (6) | 0.711 | 0.536 | 0.630 | 0.564 | 0.574 |
| (7) | 0.393 | 0.408 | 0.362 | 0.428 | 0.373 |
| (8) | 1.823 | 0.910 | 1.630 | 2.062 | 2.109 |
| (9) | −0.041 | −0.082 | −0.043 | −0.030 | −0.070 |

| | Embodiment | | | | |
|---|---|---|---|---|---|
| | 1 | 2 | 3 | 4 | 5 |
| First lens unit Positive lens vd_1 | 94.900 | 81.540 | 94.900 | 94.900 | 81.540 |
| First lens unit Positive lens vd_2 | 48.500 | 81.540 | 94.900 | 94.930 | 81.540 |
| First lens unit Positive lens vd_3 | 48.500 | 74.700 | 48.500 | 81.540 | 81.540 |
| v1pave | 63.967 | 79.26 | 79.433 | 90.457 | 81.540 |
| Second lens unit Negative lens vd_1 | 42.700 | 42.730 | 52.320 | 40.800 | 49.600 |
| Second lens unit Negative lens vd_2 | 59.500 | 70.230 | | 59.400 | 94.930 |
| Second lens unit Negative lens vd_3 | 96.100 | | | 94.900 | 94.930 |

TABLE 1-continued

| | | | | | |
|---|---|---|---|---|---|
| ν2nave | 66.1 | 56.48 | 52.32 | 65.033 | 79.820 |
| Lens unit B Positive lens vd_1 | 25.500 | 18.900 | 23.800 | 22.800 | 50.230 |
| νBpave | 25.500 | 18.900 | 23.800 | 22.800 | 42.730 |
| Lens unit C Positive lens vd_1 | 81.500 | 74.700 | 70.200 | 70.200 | 53.870 |
| Lens unit C Positive lens vd_2 | 74.700 | 45.790 | 70.200 | 70.200 | 94.930 |
| νCpave | 78.100 | 60.245 | 70.200 | 70.200 | 74.400 |
| ν1nave | 31.600 | 31.600 | 31.600 | 31.300 | 40.760 |
| Lens unit B Negative lens vd_1 | 55.500 | 32.300 | 44.200 | 39.600 | 42.730 |
| νBnave | 55.500 | 32.300 | 44.200 | 39.600 | 50.230 |
| f1 | 54.967 | 57.212 | 52.001 | 64.118 | 87.101 |
| LD | 139.931 | 140.063 | 143.638 | 149.980 | 233.407 |
| fC | 30.154 | 62.880 | 31.896 | 31.092 | 41.297 |
| fB | −26.348 | −25.582 | −27.599 | −22.059 | −91.790 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-207608, filed Oct. 24, 2016, which is hereby incorporated by reference herein in its entirety.

What is claimed is:

1. A zoom lens, comprising, in order from the object side to the image side:
    a first lens unit having a positive refractive power;
    a second lens unit having a negative refractive power; and
    a rear lens system including a plurality of lens units,
    the rear lens system comprising a lens unit A having a positive refractive power, a lens unit B having a negative refractive power, and a lens unit C having a positive refractive power, the lens unit A, the lens unit B and the lens unit C being arranged in said order from the object side to the image side,
    wherein the first lens unit is not moved during zooming, the lens unit A is moved during zooming, and intervals between adjacent lens units are changed during zooming,
    wherein the first lens unit includes a positive lens and a negative lens, the lens unit C includes a positive lens and a negative lens, the second lens unit includes a negative lens, and the lens unit B includes a positive lens, and
    wherein the following conditional expressions are satisfied:

$$60.0 < \nu1pave < 95.0;$$
    $$50.0 < \nu2nave < 90.0;$$
    $$1.6 < \nu1pave/\nu Bpave < 5.0; \text{ and}$$
    $$0.6 < \nu1pave/\nu Cpave < 1.4,$$

where ν1pave represents an average value of Abbe numbers of materials of positive lenses included in the first lens unit, ν2nave represents an average value of Abbe numbers of materials of negative lenses included in the second lens unit, νBpave represents an average value of Abbe numbers of materials of positive lenses included in the lens unit B, and νCpave represents an average value of Abbe numbers of materials of positive lenses included in the lens unit C.

2. The zoom lens according to claim 1, wherein the following conditional expression is satisfied:

$$1.8 < \nu1pave/\nu1nave < 4.0,$$

where ν1nave represents an average value of Abbe numbers of materials of negative lenses included in the first lens unit.

3. The zoom lens according to claim 1,
    wherein the lens unit B includes a negative lens, and
    wherein the following conditional expression is satisfied:

$$0.3 < \nu Bnave/\nu Cpave < 0.9,$$

where νBnave represents an average value of Abbe numbers of materials of negative lenses included in the lens unit B.

4. The zoom lens according to claim 1, wherein the first lens unit includes at least four lenses.

5. The zoom lens according to claim 1, wherein the following conditional expression is satisfied:

$$0.2 < f1/LD < 0.5,$$

where f1 represents a focal length of the first lens unit, and LD represents a distance from a surface vertex of a lens surface closest to the object side of the first lens unit to an image plane.

6. The zoom lens according to claim 1, wherein the following conditional expression is satisfied:

$$0.8 < f1/fC < 2.5,$$

where f1 represents a focal length of the first lens unit, and fC represents a focal length of the lens unit C.

7. The zoom lens according to claim 1, wherein the following conditional expression is satisfied:

$$-0.10 < (fB \times fC)/LD^2 < -0.02,$$

where fB represents a focal length of the lens unit B, fC represents a focal length of the lens unit C, and LD represents a distance from a surface vertex of a lens surface closest to the object side of the first lens unit to an image plane.

8. The zoom lens according to claim 1,
    wherein the rear lens system comprises, in order from the object side to the image side, a third lens unit having a positive refractive power, a fourth lens unit having a negative refractive power, and a fifth lens unit having a positive refractive power.

9. The zoom lens according to claim 1,
    wherein the rear lens system comprises, in order from the object side to the image side, a third lens unit having a negative refractive power, a fourth lens unit having a positive refractive power, a fifth lens unit having a negative refractive power, and a sixth lens unit having a positive refractive power.

10. The zoom lens according to claim 1,
wherein the rear lens system comprises, in order from the object side to the image side, a third lens unit having a positive refractive power, a fourth lens unit having a positive refractive power, a fifth lens unit having a positive refractive power, a sixth lens unit having a negative refractive power, and a seventh lens unit having a positive refractive power.

11. The zoom lens according to claim 1,
wherein the rear lens system comprises, in order from the object side to the image side, a third lens unit having a positive refractive power, a fourth lens unit having a negative refractive power, a fifth lens unit having a positive refractive power, and a sixth lens unit having a positive refractive power.

12. An image pickup apparatus, comprising:
a zoom lens, comprising, in order from the object side to the image side:
- a first lens unit having a positive refractive power;
- a second lens unit having a negative refractive power; and
- a rear lens system including a plurality of lens units, the rear lens system comprising a lens unit A having a positive refractive power, a lens unit B having a negative refractive power, and a lens unit C having a positive refractive power, the lens unit A, the lens unit B and the lens unit C being arranged in said order from the object side to the image side, wherein the first lens unit is not moved during zooming, the lens unit A is moved during zooming, and intervals between adjacent lens units are changed during zooming, wherein the first lens unit includes a positive lens and a negative lens, the lens unit C includes a positive lens and a negative lens, the second lens unit includes a negative lens, and the lens unit B includes a positive lens, and wherein the following conditional expressions are satisfied:

$$60.0 < \nu1pave < 95.0;$$

$$50.0 < \nu2nave < 90.0;$$

$$1.6 < \nu1pave/\nu Bpave < 5.0; \text{ and}$$

$$0.6 < \nu1pave/\nu Cpave < 1.4,$$

where ν1pave represents an average value of Abbe numbers of materials of positive lenses included in the first lens unit, ν2nave represents an average value of Abbe numbers of materials of negative lenses included in the second lens unit, νBpave represents an average value of Abbe numbers of materials of positive lenses included in the lens unit B, and νCpave represents an average value of Abbe numbers of materials of positive lenses included in the lens unit C; and an image pickup element, which receives an image formed by the zoom lens.

* * * * *